(12) United States Patent
Guo et al.

(10) Patent No.: US 12,509,528 B2
(45) Date of Patent: Dec. 30, 2025

(54) ANTIBODY BINDING TO HUMAN CD38, PREPARATION METHOD THEREOF, AND USE THEREOF

(71) Applicant: SUNSHINE GUOJIAN PHARMACEUTICAL (SHANGHAI) CO., LTD., Shanghai (CN)

(72) Inventors: Wei Guo, Shanghai (CN); Jie Zhao, Shanghai (CN); Le Zhao, Shanghai (CN); Qingcheng Liu, Shanghai (CN); Jianhe Chen, Shanghai (CN); Haomin Huang, Shanghai (CN); Zhenping Zhu, Shanghai (CN)

(73) Assignee: SUNSHINE GUOJIAN PHARMACEUTICAL (SHANGHAI) CO., LTD., Shanghai (CN)

( * ) Notice: Subject to any disclaimer, the term of this patent is extended or adjusted under 35 U.S.C. 154(b) by 525 days.

(21) Appl. No.: 18/041,351

(22) PCT Filed: Aug. 11, 2021

(86) PCT No.: PCT/CN2021/112148
§ 371 (c)(1),
(2) Date: Feb. 10, 2023

(87) PCT Pub. No.: WO2022/033535
PCT Pub. Date: Feb. 17, 2022

(65) Prior Publication Data
US 2023/0322943 A1  Oct. 12, 2023

(30) Foreign Application Priority Data

Aug. 12, 2020 (CN) .......................... 202010805420.2

(51) Int. Cl.
| | | |
|---|---|---|
| C07K 16/28 | (2006.01) | |
| A61K 39/00 | (2006.01) | |
| A61P 35/00 | (2006.01) | |
| C12N 5/10 | (2006.01) | |
| C12N 15/63 | (2006.01) | |
| G01N 33/574 | (2006.01) | |

(52) U.S. Cl.
CPC .......... *C07K 16/2896* (2013.01); *A61P 35/00* (2018.01); *C12N 15/63* (2013.01); *G01N 33/57484* (2013.01); *A61K 2039/505* (2013.01); *C07K 2317/24* (2013.01); *C07K 2317/565* (2013.01); *C07K 2317/622* (2013.01); *C07K 2317/76* (2013.01); *C12N 5/10* (2013.01); *C12N 2510/00* (2013.01); *C12N 2800/00* (2013.01)

(58) Field of Classification Search
CPC .......... C07K 16/2896; C07K 2317/24; C07K 2317/565; C07K 2317/622; C07K 2317/76; A61P 35/00; C12N 15/63; C12N 5/10; C12N 2510/00; C12N 2800/00; G01N 33/57484; A61K 2039/505
See application file for complete search history.

(56) References Cited

U.S. PATENT DOCUMENTS

| | | |
|---|---|---|
| 8,153,765 B2 | 4/2012 | Park et al. |
| 11,713,357 B2 | 8/2023 | Lv et al. |
| 2011/0099647 A1 | 4/2011 | De Weers et al. |
| 2020/0190209 A1 | 6/2020 | Merchiers et al. |
| 2022/0275100 A1 | 9/2022 | Ye et al. |

FOREIGN PATENT DOCUMENTS

| | | |
|---|---|---|
| CN | 101218256 A | 7/2008 |
| CN | 109265551 A | 1/2019 |
| CN | 111051344 A | 4/2020 |
| JP | 2010-506582 A | 3/2010 |
| WO | 2005103083 A2 | 11/2005 |
| WO | WO-2019/154421 A1 | 8/2019 |
| WO | 2020056790 A1 | 3/2020 |
| WO | WO-2020/052546 A1 | 3/2020 |

OTHER PUBLICATIONS

Nov. 11, 2021—(WO) International Search Report and Written Opinion—App PCT/CN/2021/112148.
Van De Donk, N.W.C.J. et al., "CD38 Antibodies in Multiple Myeloma: Mechanisms of Action and Modes of Resistance", Frontiers in Immunology, vol. 9, Sep. 20, 2018 (Sep. 20, 2018), pp. 1-12.
(Wen, Xinyu et al.), "Preparation, Characterization and Function Assay of Monoclonal Antibodies to Human CD38" (Immunological Journal), vol. 19, No. 1, Jan. 31, 2003 (Jan. 31, 2003), pp. 69-72.
Deckert J, et al., "SAR650984, a novel humanized CD38-targeting antibody, demonstrates potent antitumor activity in models of multiple myeloma and other CD38+ hematologic malignancies", Clin Cancer Res. Sep. 2014;20(17) 4574-4583.
WHO Drug Information vol. 24, No. 1, 2010 "International Nonproprietary Names for Pharmaceutical Substances (INN)".
WHO Drug Information, vol. 29, No. 3, 2015 "International Nonproprietary Names for Pharmaceutical Substances (INN)".
Notice of Reasons for Refusal issued Apr. 2, 2024 in Japanese Patent Application No. 2023- 509608 (3 pages) with an English translation (4 pages).
Gao et al., Advances in anti-CD38 monoclonal antibody in the treatment of multiple myeloma, *Modern Oncology*, May 2019, vol. 27, No. 09, pp. 1617-1620.

*Primary Examiner* — Janet L Andres
*Assistant Examiner* — Carol Ann Chase
(74) *Attorney, Agent, or Firm* — Banner & Witcoff, Ltd.

(57) ABSTRACT

An antibody or an antigen-binding fragment thereof that binds to human CD38. The antibody or the antigen-binding fragment thereof can effectively bind to human CD38 and is applied to preparing a drug for treating diseases having strong CD38 expression such as multiple myeloma.

22 Claims, 8 Drawing Sheets
Specification includes a Sequence Listing.

SEQUENCE LISTING

```
<160> NUMBER OF SEQ ID NOS: 22

<210> SEQ ID NO 1
<211> LENGTH: 5
<212> TYPE: PRT
<213> ORGANISM: Mus musculus

<400> SEQUENCE: 1

Thr Tyr Trp Met Gln
1               5

<210> SEQ ID NO 2
<211> LENGTH: 17
<212> TYPE: PRT
<213> ORGANISM: Mus musculus

<400> SEQUENCE: 2

Ala Ile Tyr Pro Gly Asp Gly Asp Ile Thr Tyr Asn Gln Lys Phe Lys
1               5                   10                  15

Gly

<210> SEQ ID NO 3
<211> LENGTH: 11
<212> TYPE: PRT
<213> ORGANISM: Mus musculus

<400> SEQUENCE: 3

Glu Gly Tyr Tyr Tyr Gly Gly Ala Leu Asp Tyr
1               5                   10

<210> SEQ ID NO 4
<211> LENGTH: 12
<212> TYPE: PRT
```

<213> ORGANISM: Mus musculus

<400> SEQUENCE: 4

Thr Ala Ser Ser Ser Val Ser Ser Tyr Leu His
1               5                   10

<210> SEQ ID NO 5
<211> LENGTH: 7
<212> TYPE: PRT
<213> ORGANISM: Mus musculus

<400> SEQUENCE: 5

Gly Thr Ser Asn Leu Ala Ser
1               5

<210> SEQ ID NO 6
<211> LENGTH: 9
<212> TYPE: PRT
<213> ORGANISM: Mus musculus

<400> SEQUENCE: 6

His Arg Tyr His Arg Ser Pro Trp Thr
1               5

<210> SEQ ID NO 7
<211> LENGTH: 120
<212> TYPE: PRT
<213> ORGANISM: Mus musculus

<400> SEQUENCE: 7

Gln Val Gln Leu Gln Gln Ser Gly Ala Glu Leu Ala Arg Pro Gly Ala
1               5                   10                  15

Ser Val Lys Leu Ser Cys Lys Ala Ser Gly Tyr Thr Phe Asn Thr Tyr
            20                  25                  30

Trp Met Gln Trp Val Lys Gln Arg Pro Gly Gln Gly Leu Glu Trp Ile
        35                  40                  45

Gly Ala Ile Tyr Pro Gly Asp Gly Asp Ile Thr Tyr Asn Gln Lys Phe
    50                  55                  60

Lys Gly Lys Ala Thr Leu Thr Ala Asp Lys Ser Ser Asn Thr Ala Tyr
65                  70                  75                  80

Met His Leu Ser Ser Leu Ala Ser Glu Asp Ser Ala Val Tyr Tyr Cys
                85                  90                  95

Ala Arg Glu Gly Tyr Tyr Gly Gly Ala Leu Asp Tyr Trp Gly Gln
            100                 105                 110

Gly Thr Ser Val Thr Val Ser Ser
            115                 120

<210> SEQ ID NO 8
<211> LENGTH: 108
<212> TYPE: PRT
<213> ORGANISM: Mus musculus

<400> SEQUENCE: 8

Gln Ile Phe Leu Thr Gln Ser Pro Ala Ile Met Ser Ala Ser Leu Gly
1               5                   10                  15

Glu Arg Val Thr Met Thr Cys Thr Ala Ser Ser Val Ser Ser
            20                  25                  30

Tyr Leu His Trp Tyr Gln Gln Lys Pro Gly Ser Pro Pro Lys Leu Trp
        35                  40                  45

Met Tyr Gly Thr Ser Asn Leu Ala Ser Gly Val Pro Pro Arg Phe Ser

```
                    50                  55                  60
Gly Ser Gly Ser Gly Thr Ser Tyr Ser Leu Thr Ile Ser Ser Met Glu
 65                  70                  75                  80

Ala Glu Asp Ala Ala Thr Tyr Tyr Cys His Arg Tyr His Arg Ser Pro
                     85                  90                  95

Trp Thr Phe Gly Gly Gly Thr Lys Leu Glu Ile Lys
                100                 105
```

<210> SEQ ID NO 9
<211> LENGTH: 120
<212> TYPE: PRT
<213> ORGANISM: Artificial Sequence
<220> FEATURE:
<223> OTHER INFORMATION: CD38 humanized antibody heavy chain variable
      region 50G12-Hu-VH

<400> SEQUENCE: 9

```
Gln Val Gln Leu Val Gln Ser Gly Ala Glu Val Lys Lys Pro Gly Ala
 1               5                  10                  15

Ser Val Lys Val Ser Cys Lys Ala Ser Gly Tyr Thr Phe Asn Thr Tyr
                20                  25                  30

Trp Met Gln Trp Val Arg Gln Ala Pro Gly Gln Gly Leu Glu Trp Met
            35                  40                  45

Gly Ala Ile Tyr Pro Gly Asp Gly Asp Ile Thr Tyr Asn Gln Lys Phe
     50                  55                  60

Lys Gly Arg Val Thr Leu Thr Ala Asp Lys Ser Thr Ser Thr Val Tyr
 65                  70                  75                  80

Met Glu Leu Ser Ser Leu Arg Ser Glu Asp Thr Ala Val Tyr Tyr Cys
                85                  90                  95

Ala Arg Glu Gly Tyr Tyr Tyr Gly Gly Ala Leu Asp Tyr Trp Gly Gln
            100                 105                 110

Gly Thr Leu Val Thr Val Ser Ser
        115                 120
```

<210> SEQ ID NO 10
<211> LENGTH: 108
<212> TYPE: PRT
<213> ORGANISM: Artificial Sequence
<220> FEATURE:
<223> OTHER INFORMATION: CD38 humanized antibody light chain variable
      region 50G12-Hu-VL

<400> SEQUENCE: 10

```
Asp Ile Gln Met Thr Gln Ser Pro Ser Ser Leu Ser Ala Ser Val Gly
 1               5                  10                  15

Asp Arg Val Thr Ile Thr Cys Thr Ala Ser Ser Ser Val Ser Ser Ser
                20                  25                  30

Tyr Leu His Trp Tyr Gln Gln Lys Pro Gly Lys Ala Pro Lys Leu Trp
            35                  40                  45

Met Tyr Gly Thr Ser Asn Leu Ala Ser Gly Val Pro Ser Arg Phe Ser
     50                  55                  60

Gly Ser Gly Ser Gly Thr Asp Tyr Thr Leu Thr Ile Ser Ser Leu Gln
 65                  70                  75                  80

Pro Glu Asp Phe Ala Thr Tyr Tyr Cys His Arg Tyr His Arg Ser Pro
                85                  90                  95

Trp Thr Phe Gly Gln Gly Thr Lys Val Glu Ile Lys
                100                 105
```

-continued

```
<210> SEQ ID NO 11
<211> LENGTH: 450
<212> TYPE: PRT
<213> ORGANISM: Artificial Sequence
<220> FEATURE:
<223> OTHER INFORMATION: CD38 humanized antibody heavy chain 50G12-Hu-HC

<400> SEQUENCE: 11

Gln Val Gln Leu Val Gln Ser Gly Ala Glu Val Lys Pro Gly Ala
1               5                   10                  15

Ser Val Lys Val Ser Cys Lys Ala Ser Gly Tyr Thr Phe Asn Thr Tyr
            20                  25                  30

Trp Met Gln Trp Val Arg Gln Ala Pro Gly Gln Gly Leu Glu Trp Met
        35                  40                  45

Gly Ala Ile Tyr Pro Gly Asp Gly Asp Ile Thr Tyr Asn Gln Lys Phe
    50                  55                  60

Lys Gly Arg Val Thr Leu Thr Ala Asp Lys Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Glu Gly Tyr Tyr Tyr Gly Gly Ala Leu Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365

Thr Cys Leu Val Lys Gly Phe Tyr Pro Ser Asp Ile Ala Val Glu Trp
```

```
                370                 375                 380
Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
            405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly Lys
    450

<210> SEQ ID NO 12
<211> LENGTH: 215
<212> TYPE: PRT
<213> ORGANISM: Artificial Sequence
<220> FEATURE:
<223> OTHER INFORMATION: CD38 humanized antibody light chain 50G12-Hu-LC

<400> SEQUENCE: 12

Asp Ile Gln Met Thr Gln Ser Pro Ser Ser Leu Ser Ala Ser Val Gly
1               5                   10                  15

Asp Arg Val Thr Ile Thr Cys Thr Ala Ser Ser Ser Val Ser Ser Ser
            20                  25                  30

Tyr Leu His Trp Tyr Gln Gln Lys Pro Gly Lys Ala Pro Lys Leu Trp
        35                  40                  45

Met Tyr Gly Thr Ser Asn Leu Ala Ser Gly Val Pro Ser Arg Phe Ser
50                  55                  60

Gly Ser Gly Ser Gly Thr Asp Tyr Thr Leu Thr Ile Ser Ser Leu Gln
65                  70                  75                  80

Pro Glu Asp Phe Ala Thr Tyr Tyr Cys His Arg Tyr His Arg Ser Pro
                85                  90                  95

Trp Thr Phe Gly Gln Gly Thr Lys Val Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 13
<211> LENGTH: 360
<212> TYPE: DNA
<213> ORGANISM: Mus musculus

<400> SEQUENCE: 13
caggttcagc tccagcagtc tggggctgag ctggcaagac ctggggcctc agtgaagttg    60
```

```
tcctgcaagg cttctggcta cacctttaat acctattgga tgcagtgggt aaaacagagg    120
cctggacagg gtctggaatg gattgggct atttatcctg agatggtga tattacatat     180 aatcagaagt ttaagggcaa ggccacattg actgcagata atcttccaa cacagcctac    240 atgcacctca gcagcttggc atctgaggac tcagcggtct attactgtgc aagagaggga    300
tattattacg gcggggcttt ggactactgg ggtcaaggaa cctcagtcac cgtctcctca    360
```

<210> SEQ ID NO 14
<211> LENGTH: 324
<212> TYPE: DNA
<213> ORGANISM: Mus musculus

<400> SEQUENCE: 14

```
caaattttc tcacccagtc tccagcaatc atgtctgcat ctctagggga acgggtcacc     60
atgacctgca ctgccagctc aagtgtgagt tcaagctact tgcactggta ccagcagaag    120
ccaggatccc cccccaaact ctggatgtat ggcacatcca acctggcttc tggagtccca    180
cctcgcttca gtggcagtgg gtctgggacc tcttactctc tcacaatcag cagcatggag    240
gctgaagatg ctgccactta ttactgccac cggtatcatc gttccccgtg gacgttcggt    300
ggaggcacca agctggaaat caaa                                           324
```

<210> SEQ ID NO 15
<211> LENGTH: 360
<212> TYPE: DNA
<213> ORGANISM: Artificial Sequence
<220> FEATURE:
<223> OTHER INFORMATION: 50G12-Hu-VH heavy chain variable region
      nucleotide sequence

<400> SEQUENCE: 15

```
caggtgcagc tcgtgcagtc cggcgctgag gtgaagaagc ccggcgcctc cgtgaaggtg    60
tcctgcaagg cctccggcta caccttcaac acctattgga tgcaatgggt gaggcaggcc    120
cccggccagg gcctggagtg gatgggcgcc atctaccccg gcgatggcga catcacctac    180
aaccagaagt ttaagggcag ggtgacccctg acagctgata atctacatc tactgtgtac    240 atggagttat cttctctgag atctgaggat acagctgtgt actattgtgc tagagaggga    300
tactattatg gcggagccct ggattattgg ggacagggaa cactggtgac agtgtcttct    360
```

<210> SEQ ID NO 16
<211> LENGTH: 324
<212> TYPE: DNA
<213> ORGANISM: Artificial Sequence
<220> FEATURE:
<223> OTHER INFORMATION: 50G12-Hu-LC light chain variable region
      nucleotide sequence

<400> SEQUENCE: 16

```
gatatccaga tgacccagtc tccttcttcc ctgtccgctt ctgtgggaga tagagtgaca    60
attacatgta ccgcttcttc ttctgtgtct tcttcttacc tgcattggta tcagcagaag    120
cctggcaagg ctcctaaaact gtggatgtat ggaacatcta atctggcttc tggcgtgcct    180
tctagatttt ctggctctgg atctggcacc gattacacac tgaccatctc tagcctgcag    240
cctgaggatt ttgccacata ctactgtcac agatatcaca gatctccttg gacctttggc    300
cagggcacca aggtggagat caag                                           324
```

<210> SEQ ID NO 17
<211> LENGTH: 1350

```
<212> TYPE: DNA
<213> ORGANISM: Artificial Sequence
<220> FEATURE:
<223> OTHER INFORMATION: 50G12-Hu-HC heavy chain nucleotide sequence

<400> SEQUENCE: 17
caggtgcagc tcgtgcagtc cggcgctgag gtgaagaagc ccggcgcctc cgtgaaggtg      60
tcctgcaagg cctccggcta caccttcaac acctattgga tgcaatgggt gaggcaggcc     120
cccggccagg gcctggagtg gatgggcgcc atctaccccg cgatggcga catcacctac      180 aaccagaagt ttaagggcag ggtgaccctg acagctgata atctacatc tactgtgtac      240 atggagttat cttctctgag atctgaggat acagctgtgt actattgtgc tagagaggga     300
tactattatg gcggagccct ggattattgg ggacagggaa cactggtgac agtgtcttct     360
gcgagcacca agggaccttc cgtgtttccc ctcgccccca gctccaaaag caccagcggc     420
ggaacagctg ctctcggctg tctcgtcaag gattacttcc ccgagcccgt gaccgtgagc     480
tggaacagcg gagccctgac aagcggcgtc cacaccttcc ctgctgtcct acagtcctcc     540
ggactgtaca gcctgagcag cgtggtgaca gtccctagca gctccctggg cacccagaca     600
tatatttgca acgtgaatca caagcccagc aacaccaagg tcgataagaa ggtggagcct     660
aagtcctgcg acaagaccca cacatgtccc cctgtcccg ctcctgaact gctgggaggc      720
ccttccgtgt tcctgttccc ccctaagccc aaggacaccc tgatgatttc aggacaccc      780 gaggtgacct gtgtggtggt ggacgtcagc cacgaggacc ccgaggtgaa attcaactgg     840
tacgtcgatg gcgtggaggt gcacaacgct aagaccaagc caggagga gcagtacaat       900 tccacctaca gggtggtgtc cgtgctgacc gtcctccatc aggactggct gaacggcaaa     960
gagtataagt gcaaggtgag caacaaggcc ctccctgctc ccatcgagaa gaccatcagc    1020
aaagccaagg gccagcccag gaaccctcaa gtctatatccc tgcctccag cagggaggag   1080 atgaccaaga accaagtgag cctcacatgc ctcgtcaagg gcttctatcc ttccgatatt    1140
gccgtcgagt gggagtccaa cggacagccc gagaacaact acaagacaac accccccgtg   1200
ctcgattccg atggcagctt cttcctgtac tccaagctga ccgtggacaa gtccagatgg    1260
caacaaggca acgtcttcag ttgcagcgtc atgcatgagg ccctccacaa ccactacacc    1320
cagaagagcc tctccctgag ccctggaaag                                      1350

<210> SEQ ID NO 18
<211> LENGTH: 645
<212> TYPE: DNA
<213> ORGANISM: Artificial Sequence
<220> FEATURE:
<223> OTHER INFORMATION: 50G12-Hu-HC light chain nucleotide sequence

<400> SEQUENCE: 18
gatatccaga tgacccagtc tccttcttcc ctgtccgctt ctgtgggaga tagagtgaca      60
attacatgta ccgcttcttc ttctgtgtct tcttcttacc tgcattggta tcagcagaag     120
cctggcaagg ctcctaaact gtggatgtat ggaacatcta atctggcttc tggcgtgcct     180
tctagatttt ctggctctgg atctggcacc gattacacac tgaccatctc tagcctgcag     240
cctgaggatt ttgccacata ctactgtcac agatatcaca gatctccttg gacctttggc     300
cagggcacca aggtggagat caagagaacc gtcgccgctc ccagcgtctt catcttcccc     360
cccagcgatg agcagctgaa gagcggaacc gccagcgtgg tgtgcctgct gaacaacttc     420
taccccaggg aggccaaggt gcaatggaag gtggacaacg ccctacagag cggcaactcc     480
```

```
caggagagcg tgaccgagca ggacagcaag gatagcacct acagcctgag cagcacccte      540 accctgagca aggccgacta cgagaagcac aaggtgtacg cctgcgaggt gacccatcag      600
ggcctgagca gccctgtgac caagagcttc aacagggcg agtgc                      645
```

<210> SEQ ID NO 19
<211> LENGTH: 122
<212> TYPE: PRT
<213> ORGANISM: Artificial Sequence
<220> FEATURE:
<223> OTHER INFORMATION: Daratumumab heavy chain variable region amino
      acid

<400> SEQUENCE: 19

```
Glu Val Gln Leu Leu Glu Ser Gly Gly Gly Leu Val Gln Pro Gly Gly
1               5                   10                  15

Ser Leu Arg Leu Ser Cys Ala Val Ser Gly Phe Thr Phe Asn Ser Phe
            20                  25                  30

Ala Met Ser Trp Val Arg Gln Ala Pro Gly Lys Gly Leu Glu Trp Val
        35                  40                  45

Ser Ala Ile Ser Gly Ser Gly Gly Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Phe Cys
                85                  90                  95

Ala Lys Asp Lys Ile Leu Trp Phe Gly Glu Pro Val Phe Asp Tyr Trp
            100                 105                 110

Gly Gln Gly Thr Leu Val Thr Val Ser Ser
        115                 120
```

<210> SEQ ID NO 20
<211> LENGTH: 107
<212> TYPE: PRT
<213> ORGANISM: Artificial Sequence
<220> FEATURE:
<223> OTHER INFORMATION: Daratumumab light chain variable region amino
      acid

<400> SEQUENCE: 20

```
Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Thr Phe Gly Gln Gly Thr Lys Val Glu Ile Lys
            100                 105
```

<210> SEQ ID NO 21
<211> LENGTH: 120
<212> TYPE: PRT
<213> ORGANISM: Artificial Sequence
<220> FEATURE:

```
<223> OTHER INFORMATION: Isatuximab heavy chain variable region amino
      acid

<400> SEQUENCE: 21

Gln Val Gln Leu Val Gln Ser Gly Ala Glu Val Ala Lys Pro Gly Thr
1               5                   10                  15

Ser Val Lys Leu Ser Cys Lys Ala Ser Gly Tyr Thr Phe Thr Asp Tyr
            20                  25                  30

Trp Met Gln Trp Val Lys Gln Arg Pro Gly Gln Gly Leu Glu Trp Ile
        35                  40                  45

Gly Thr Ile Tyr Pro Gly Asp Gly Asp Thr Gly Tyr Ala Gln Lys Phe
    50                  55                  60

Gln Gly Lys Ala Thr Leu Thr Ala Asp Lys Ser Ser Lys Thr Val Tyr
65                  70                  75                  80

Met His Leu Ser Ser Leu Ala Ser Glu Asp Ser Ala Val Tyr Tyr Cys
                85                  90                  95

Ala Arg Gly Asp Tyr Tyr Gly Ser Asn Ser Leu Asp Tyr Trp Gly Gln
            100                 105                 110

Gly Thr Ser Val Thr Val Ser Ser
            115                 120

<210> SEQ ID NO 22
<211> LENGTH: 107
<212> TYPE: PRT
<213> ORGANISM: Artificial Sequence
<220> FEATURE:
<223> OTHER INFORMATION: Isatuximab light chain variable region amino
      acid

<400> SEQUENCE: 22

Asp Ile Val Met Thr Gln Ser His Leu Ser Met Ser Thr Ser Leu Gly
1               5                   10                  15

Asp Pro Val Ser Ile Thr Cys Lys Ala Ser Gln Asp Val Ser Thr Val
            20                  25                  30

Val Ala Trp Tyr Gln Gln Lys Pro Gly Gln Ser Pro Arg Arg Leu Ile
        35                  40                  45

Tyr Ser Ala Ser Tyr Arg Tyr Ile Gly Val Pro Asp Arg Phe Thr Gly
    50                  55                  60

Ser Gly Ala Gly Thr Asp Phe Thr Phe Thr Ile Ser Ser Val Gln Ala
65                  70                  75                  80

Glu Asp Leu Ala Val Tyr Tyr Cys Gln Gln His Tyr Ser Pro Pro Tyr
                85                  90                  95

Thr Phe Gly Gly Gly Thr Lys Leu Glu Ile Lys
            100                 105
```

ANTIBODY BINDING TO HUMAN CD38, PREPARATION METHOD THEREOF, AND USE THEREOF

CROSS REFERENCE TO RELATED APPLICATIONS

This application is a national stage application (under 35 U.S.C. § 371) of PCT/CN2021/112148, filed on Aug. 11, 2021, which claims the benefit of Chinese Patent Application No. 202010805420.2 filed Aug. 12, 2020, each of which is incorporated herein by reference in its entirety.

SUBMISSION OF SEQUENCE LISTING

The instant application contains a Sequence Listing which has been submitted electronically in ASCII format and is hereby incorporated by reference in its entirety. Said ASCII copy, created on Feb. 24, 2023, is named "18041351_sub-SL.txt" and is 21,380 bytes in size.

TECHNICAL FIELD

The present invention belongs to the field of tumor treatment, and relates to an antibody binding to human CD38, preparation method thereof, and use thereof.

BACKGROUND

Multiple myeloma (MM) is a plasmacytic malignancy that accounts for about 1% of all cancers. It is prone to affect bone and kidney, and is prone to cause pathogenic fractures, bone pain, spinal cord compression, and renal failure. For the treatment of multiple myeloma, traditional chemotherapy, radiotherapy and other treatments are difficult to achieve satisfactory results. Over the past decade, intensive research for myeloma biology has revealed many new potential therapeutic targets.

CD38 is a type II transmembrane glycoprotein with 46 kDa, and CD38 has been found to have a variety of functions, including extracellular enzyme activity and receptor-mediated regulation of cell adhesion and signal transduction. The enzymatic activity of CD3 involves the conversion of nicotinamide adenine dinucleotide (NAD+) and nicotinamide adenine dinucleotide phosphate (NADP+) to cyclic adenosine diphosphate ribose (CADPR), ADPR, and nicotinate adenine dinucleotide phosphate (NAADP), which are substrates necessary for the regulation of intracellular calcium signaling. In preliminary studies of CD38 receptor function, it was found that CD38 mediated the binding of cells to endothelial cells, played a role in lymphocyte migration, and had functional connections with surface molecules of T, B, and natural killer (NK) cells. CD38 is expressed at high levels only in progenitor bone marrow, germinal center B lymphocytes, terminally differentiated plasma cells, and activated tonsils, whereas mature and memory B lymphocytes express low levels of CD38. CD38 is strongly expressed in multiple myeloma cells, making it an ideal target for the treatment of multiple myeloma. Currently, Daratumumab and Isatuximab on the market have shown outstanding performance in the treatment of multiple myeloma. At present, there are no related products in China, and the demand for antibody therapy has not been met.

SUMMARY OF THE INVENTION

In order to solve the above technical problems, the inventor of the present invention carried out a large number of tests, from antigen immunization, hybridoma preparation and screening, antibody expression and purification to biological activity identification, screened and obtained murine antibody that specifically binds to human CD38. On this basis, its chimeric antibody and humanized antibody were further constructed and obtained.

Accordingly, the object of the present invention is to provide an antibody binding to human CD38 or the antigen-binding fragment thereof, provide a nucleotide molecule encoding the antibody binding to human CD38 or the antigen-binding fragment thereof, provide an expression vector comprising the nucleotide molecule; provide a host cells for the expression vector; provide the preparation method of the antibody binding to human CD38 or the antigen-binding fragment thereof, provide a pharmaceutical composition comprising the antibody binding to human CD38 or the antigen-binding fragment thereof, and provide the use of the antibody binding to human CD38 or the antigen-binding fragment thereof in the preparation of drugs.

In order to achieve the above objects, the present invention adopts the following technical solutions:

On the one hand, the present invention provides an antibody binding to human CD38 or the antigen-binding fragment thereof, comprising:
(a) heavy chain complementarity determining regions H-CDR1, H-CDR2, H-CDR3, wherein the amino acid sequence of H-CDR1 is shown in SEQ ID NO: 1, the amino acid sequence of H-CDR2 is shown in SEQ ID NO: 2, the amino acid sequence of the H-CDR3 is shown in SEQ ID NO: 3, and complementarity
(b) light chain complementarity determining regions L-CDR1, L-CDR2, L-CDR3, wherein the amino acid sequence of L-CDR1 is shown in SEQ ID NO:4, the amino acid sequence of L-CDR2 is shown in SEQ ID NO:5, the amino acid sequence of the L-CDR3 is shown in SEQ ID NO:6.

The "Antibody (Ab)" of the present invention is a heterotetrameric glycoprotein of about 150,000 daltons, which consists of two identical light chains (L) and two identical heavy chains (H). Each light chain is connected to the heavy chain through a covalent disulfide bond, and the numbers of disulfide bonds between heavy chains of different immunoglobulin isotypes are different. Each heavy and light chain also has regularly spaced intrachain disulfide bonds. Each heavy chain has a variable region (VH) at one end, followed by constant regions. Each light chain has a variable region (VL) at one end and a constant region at the other end; the constant region of the light chain is opposite to the first constant region of the heavy chain, and the variable region of the light chain is opposite to the variable region of the heavy chain. Antibody of the present invention includes a monoclonal antibody, a polyclonal antibody, a multi-specific antibody formed by at least two antibodies, such as a bispecific antibody, etc.

In the present invention, "monoclonal antibody" refers to an antibody obtained from a population that is essentially homogeneous, i.e. the individual antibodies contained in the population are identical except for a few possible naturally occurring mutations. Monoclonal antibody targets a single antigen site with high specificity. Furthermore, unlike conventional polyclonal antibodies preparation, which usually has different antibodies against different determinants, each monoclonal antibody targets a single determinant on an antigen. In addition to their specificity, the advantage of monoclonal antibodies is that they are synthesized by hybridoma culture and are not contaminated with other immunoglobulins. The modifier "monoclonal" indicates the properties of the antibody, which is obtained from a homogeneous antibody population, and it should not be interpreted as requiring any special method to produce the antibody.

In the present invention, "antigen-binding fragment" refers to a fragment of an antibody that can specifically bind to human CD38. Examples of antigen-binding fragments of the invention include Fab fragment, F(ab')$_2$ fragment, Fv fragment, etc. Fab fragment is a fragment produced by an antibody digested with papain. F(ab')$_2$ fragment is a fragment produced by an antibody digested with pepsin. Fv fragment is composed of a dimer that is closely non-covalently associated with the heavy and light chain variable regions of the antibody.

In another preferred embodiment, the antibody is murine antibody, chimeric antibody or humanized antibody.

In the present invention, "murine antibody" refers to the antibody derived from rats or mice, preferably mice. The murine antibody of the present invention is obtained by immunizing mice with human CD38 antigen and screening hybridoma cells.

"Chimeric antibody" of the present invention refers to an antibody comprising heavy and light chain variable region sequences derived from one species and constant region sequences derived from another species, such as an antibody having murine heavy and light chain variable regions connected to the human constant regions. Preferably, the chimeric antibody of the present invention is obtained by the splicing of murine antibody 50G12 heavy chain variable region and light chain variable region sequences with the human constant regions. Preferably, the chimeric antibody of the present invention is selected from 50G12-Chimeric.

"Humanized antibody" of the present invention refers to its CDRs are derived from non-human species (preferably mouse) antibody, and the residual portions of the antibody molecule (including frame regions and constant regions) are derived from human antibody. In addition, the residues in frame region can be altered to maintain binding affinity. Preferably, the humanized antibody of the present invention is obtained by recombination of CDR regions of mouse antibody 50G12 and non-CDR regions of human antibody, adding a fourth frame region and mutating residues that have important influence on some portions. Preferably, the humanized antibody of the present invention is selected from 50G12-Humanized.

As a preferred embodiments, the antigen-binding fragments include Fab fragment, F(ab')$_2$ fragment, Fv fragment, As a preferred embodiment, the amino acid sequence of the heavy chain variable region of the antibody binding to human CD38 or the antigen-binding fragment thereof is shown in SEQ ID NO: 7, and the amino acid sequence of the light chain variable region of that is shown in SEQ ID NO: 8.

As a preferred embodiment, the amino acid sequence of the heavy chain variable region of the antibody binding to human CD38 or the antigen-binding fragment thereof is shown in SEQ ID NO: 9, and the amino acid sequence of the light chain variable region of that is shown in SEQ ID NO: 10.

As a preferred embodiment, the amino acid sequence of the heavy chain of the antibody binding to human CD38 or the antigen-binding fragment thereof is shown in SEQ ID NO: 11, and the amino acid sequence of the light chain of that is shown in SEQ ID NO: 12.

On the other hand of the present invention, it provides a nucleotide molecule encoding the antibody binding to human CD38 or the antigen-binding fragment thereof.

As a preferred embodiment, the nucleotide sequence of the nucleotide molecule encoding the heavy chain variable region is shown in SEQ ID NO: 13, and the nucleotide sequence encoding the light chain variable region is shown in SEQ ID NO: 14.

As a preferred embodiment, the nucleotide sequence of the nucleotide molecule encoding the heavy chain variable region is shown in SEQ ID NO: 15, and the nucleotide sequence encoding the light chain variable region is shown in SEQ ID NO: 16.

As a preferred embodiment, the nucleotide sequence of the nucleotide molecule encoding the heavy chain is shown in SEQ ID NO: 17; the nucleotide sequence encoding the light chain is shown in SEQ ID NO: 18.

The preparation method of the nucleotide molecule of the present invention is a conventional preparation method in the art. Preferably, it comprises the following steps: obtaining the nucleotide molecule encoding the above-mentioned monoclonal antibody by gene cloning technology, such as PCR method etc., or obtaining the nucleotide molecule encoding the above-mentioned monoclonal antibody by the method of artificial full-length sequence synthesis.

Those skilled in the art know that the nucleotide sequence encoding the amino acid sequence of the antibody binding to human CD38 or the antigen-binding fragment thereof can be replaced, deleted, changed, inserted or added appropriately to provide a polynucleotide homolog. The polynucleotide homolog of the present invention can be prepared by replacing, deleting or adding one or more bases of the gene encoding the antibody binding to human CD38 or the antigen-binding fragment thereof within the scope of maintaining the activity of the antibody.

On the other hand of the present invention, it provides an expression vector, comprising the nucleotide molecule described above.

The expression vector mentioned herein is a conventional expression vector in the field, and refers to an expression vector comprising appropriate regulatory sequences, such as promoter sequence, terminator sequence, polyadenylate acylation sequence, enhancer sequence, marker gene and/or sequence, and other appropriate sequences. The expression vector may be a virus or plasmid, such as an appropriate bacteriophage or phagemid, for more technical details see e.g., Sambrook et al., Molecular Cloning: A Laboratory Manual, Second Edition, Cold Spring Harbor Laboratory Press, 1989. Many of the known techniques and protocols used for nucleic acid manipulation can be found in Current Protocols in Molecular Biology, Second Edition, edited by Ausubel et al. The expression vector of the present invention is preferably pDR1, pcDNA3.1 (+), pcDNA3.1/ZEO (+), pDHFR, pcDNA4, pDHFF, pGM-CSF or pCHO 1.0.

The present invention further provides a host cell containing the expression vector described above.

The host cell of the present invention is one of a variety of conventional host cells in the art, as long as the recombinant expression vector can replicate itself stably and the nucleotide carried can be effectively expressed. Wherein the host cells comprises prokaryotic expression cells and eukaryotic expression cells, and the host cells preferably comprise: COS, CHO (Chinese Hamster Ovary), NS0, sf9, sf21, DH5a, BL21 (DE3) or TG1, preferably *E. coli* TG1, BL21 (DE3) cells (expressing single-chain antibodies or Fab antibodies) or CHO-K1 cells (expressing full-length IgG antibodies). The above-mentioned expression vector is transformed into a host cell to obtain the preferred recombinant expression transformant of the present invention. The transformation method is a conventional transformation method in the art, preferably a chemical transformation method, a heat shock method or an electrotransformation method.

On the other hand of the present invention, it provides a method for preparing the antibody binding to human CD38 or the antigen-binding fragment thereof described above, which comprises the following steps:
  a) culturing the host cells described above under conditions for expression to express the antibody binding to human CD38 or the antigen-binding fragment thereof;
  b) isolating and purifying a) the antibody binding to human CD38 or the antigen-binding fragment thereof.

The culture method of the host cell of the present invention, the isolation and purification method of the antibody are conventional methods in the art, and please refer to the corresponding cell culture technology manual and antibody isolation and purification technology manual for specific operation methods. The preparation method of the antibody binding to human CD38 or the antigen-binding fragment thereof disclosed in the present invention comprises: culturing the host cells described above under conditions for expression, thereby expressing the antibody binding to human CD38 or the antigen-binding fragment thereof, isolating and purifying the antibody binding to human CD38 or the antigen-binding fragment thereof. With the above method, the recombinant protein can be purified into a substantially homogeneous substance, such as a single band on SDS-PAGE electrophoresis.

The antibody binding to human CD38 or the antigen-binding fragment thereof disclosed in the present invention may be separated and purified by affinity chromatography, and according to the characteristics of the used affinity column, conventional methods such as high salt buffer, changing PH and the like may be used to elute the antibody binding to human CD38 or the antigen-binding fragment thereof bound to the affinity column. The inventor of the present invention has conducted detection experiments on the antibody binding to human CD38 or the antigen-binding fragment thereof, and the experimental results show that the antibody binding to human CD38 or the antigen-binding fragment thereof can bind well to the antigen with a high affinity.

On the other hand of the present invention, it provides a composition, comprising the antibody binding to human CD38 or the antigen-binding fragment thereof described above and a pharmaceutically acceptable carrier.

The antibody binding to human CD38 or the antigen-binding fragment thereof provided by the present invention, may be combined with a pharmaceutically acceptable carrier to form a pharmaceutical formulation composition to exert efficacy more stably. These preparations can ensure the conformational integrity of the antibody binding to human CD38 or the antigen-binding fragment thereof disclosed in the present invention, while also protecting the multifunctional groups of protein from degradation (including but not limited to coagulation, deamination or oxidation). Typically, it is generally stable for at 2° C.-8° C. for liquid preparations and at 30° C. for at least six months for lyophilized preparations. The bispecific antibody preparation may be suspension, water injection, lyophilized preparation and other preparations commonly used in the pharmaceutical field.

For the water injection or lyophilized preparation of the antibody binding to human CD38 or the antigen-binding fragment thereof disclosed in the present invention, pharmaceutically acceptable carriers preferably include, but are not limited to: one of surfactant, solution stabilizer, isotonic modulator and buffer, or a combination thereof. Wherein surfactants preferably include, but are not limited to, non-ionic surfactants such as polyoxyethylene sorbitan fatty acid ester (Tween 20 or 80); poloxamer (e.g. poloxamer 188); Triton; sodium dodecyl sulfate (SDS); sodium lauryl sulfate; tetradecyl, linoleyl, or octadecyl sarsarine; Pluronics; MONAQUAT™ et al., the dosage of which should minimize the granulation tendency of the antibody binding to human CD38 or the antigen-binding fragment thereof. Solution stabilizers preferably include, but are not limited to, one of the following or a combination thereof: sugars, e.g., reducing sugars and non-reducing sugars; amino acids, such as monosodium glutamate or histidine; alcohols, such as ternary alcohols, advanced sugar alcohols, propylene glycol, polyethylene glycol, etc. The amount of solution stabilizer should keep the final preparation stable for the time considered stable by those skilled in the art. Isotonic modifiers preferably include, but are not limited to, one of sodium chloride, mannitol, or a combination thereof. Buffers preferably include, but are not limited to: one of Tris, histidine buffer, phosphate buffers, or a combination thereof.

On the other hand of the present invention, it provides the use of the above-mentioned antibody binding to human CD38 or pharmaceutical composition in the preparation of drugs for the treatment of multiple myeloma, leukemia, B lymphoblastoma, and autoimmune diseases. As a preferred embodiment, the autoimmune disease is selected from systemic lupus erythematosus, autoimmune hemolytic anemia, immune thrombocytopenic purpura and myasthenia gravis.

When the antibody binding to human CD38 or the antigen-binding fragment thereof and its composition of the present invention is administered to animals including humans, the administered dose varies depending on the age and weight of the patient, the characteristics and severity of the disease, and the route of administration. The results of animal experiments and various situations can be referred, and the total administered amount can not exceed a certain range. Specifically, the dose of intravenous injection is 1-1800 mg/day.

On the other hand of the present invention, it provides a CAR construct, and the scFv segment of the monoclonal antibody antigen binding region of the CAR construct is a binding region that specifically binds to CD38, and the heavy chain variable region of the scFv comprises:
  heavy chain complementarity determining regions H-CDR1, H-CDR2, H-CDR3, wherein the amino acid sequence of H-CDR1 is shown in SEQ ID NO: 1, the amino acid sequence of H-CDR2 is shown in SEQ ID NO: 2, the amino acid sequence of the H-CDR3 is shown in SEQ ID NO: 3, and
  the light chain variable region of the scFv comprises:
  light chain complementarity determining regions L-CDR1, L-CDR2, L-CDR3, wherein the L-CDR1 is shown in SEQ ID NO: 4, the amino acid sequence of L-CDR2 is shown in SEQ ID NO: 5, the amino acid sequence of the L-CDR3 is shown in SEQ ID NO: 6.

On the other hand of the present invention, it provides a recombinant immune cell, which expresses exogenous CAR constructs as described above.

On the other hand of the present invention, it provides an antibody drug conjugate, which comprises:
  (a) an antibody moiety, which comprises an antibody or the antigen-binding fragment as described above; and
  (b) a coupling moiety coupled to the antibody moiety, which is selected from the group consisting of a detectable label, a drug, a toxin, a cytokine, a radionuclide, an enzyme, and a combination thereof.

On the other hand of the present invention, it provides a non-diagnostic method for in vitro detection of CD38 protein in a sample, which comprises the steps:
(1) contacting the sample with the antibody or the antigen-binding fragment thereof or the antibody-drug conjugate as described above in vitro;
(2) detecting whether an antigen-antibody complex is formed, wherein the formation of the complex indicates the presence of CD38 protein in the sample.

On the other hand of the present invention, it provides a method for preventing and/or treating CD38-related diseases, comprising: administering to the subject in need with the antibody binding to human CD38 or the antigen-binding fragment thereof, composition, antibody-drug conjugate, recombinant immune cells as described above, or a combinations thereof.

In another preferred embodiment, the CD38-related disease is selected from multiple myeloma, leukemia, B lymphocytoma, autoimmune disease, or a combination thereof.

On the basis of conforming to common knowledge in the art, the above-mentioned preferred conditions can be combined arbitrarily to obtain preferred embodiments of the present invention.

The reagents and raw materials used in the present invention are all commercially available.

The positive progressive effect of the present invention:

At present, there is an urgent need to develop new, specific and efficient therapeutic drugs for CD38 strong expression diseases, so as to improve the quality of life of people with such diseases and provide more and more effective treatment options for patients. The 50G12-Humanized of the present invention has a high affinity for human CD38, can effectively neutralize human CD38, and can induce apoptosis after binding to the corresponding antigen on the cell membrane surface, prolonging the survival time of the test animal, and has a good clinical application prospect.

DETAILED DESCRIPTION

Figure 1:
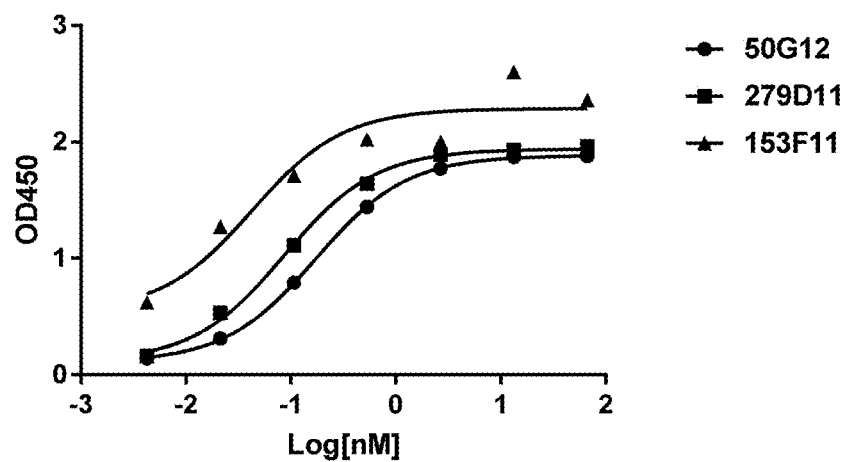
FIG. 1: Binding activity of murine antibodies to target antigen human CD38-Fc

Through extensive and intensive research, the present inventors obtained a CD38 antibody with high affinity and good biological activity after a large number of screenings, especially with excellent ADCC and CDC activity. The humanized CD38 antibody of the present invention has equivalent or even better activity than the commercially available CD38 antibody. In particular, in a mouse lymphoma model, the humanized CD38 antibody of the present invention can significantly prolong the survival time of the test animal. Therefore, the CD38 antibody of the present invention can be developed as an antitumor drug with superior curative effect. On this basis, the present invention has been completed.

The Terms

As used herein, the term "antibody (Ab)" or "immunoglobulin (IgG)" refers to a heterotetrameric glycoprotein with the same structural characteristics, which consists of two identical light chains (L) and two identical heavy chains (H). Each light chain is connected to the heavy chain through a covalent disulfide bond, and the numbers of disulfide bonds between heavy chains of different immunoglobulin isotypes are different. Each heavy and light chain also has regularly spaced intrachain disulfide bonds. Each heavy chain has a variable region (VH) at one end, followed by constant regions, which consists of three domains CH1, CH2, and CH3. Each light chain has a variable region (VL) at one end and a constant region at the other end; the constant region of the light chain is paired to the first constant region of the heavy chain, and the variable region of the light chain is paired to the variable region of the heavy chain. The constant regions are not directly involved in the binding of antibodies to antigens, but they exhibit different effector functions, such as participating in antibody-dependent cell-mediated cytotoxicity (ADCC). The heavy chain constant region includes IgG1, IgG2, IgG3, IgG4 subtypes. The light chain constant region includes κ (Kappa) or λ (Lambda). The heavy and light chains of the antibody are covalently linked together by disulfide bonds between the CH1 domain of the heavy chain and the CL domain of the light chain, and the two heavy chains of the antibody are covalently linked together by the polypeptide disulfide bonds formed between the hinge regions.

In the present invention, the terms "Fab" and "Fc" refer to papain may cleave the antibody into two identical Fab segments and one Fc segment. The Fab segment consists of VH and CH1 of the heavy chain of the antibody and VL and CL domains of the light chain. The Fc segment is fragment crystallizable (Fc), which consists of CH2 and CH3 domains of the antibody. The Fc segment has no antigen-binding activity and is the site of interaction between antibodies and effector molecules or cells.

In the present invention, the term "scFv" refers to a single-chain antibody fragment (scFv), which is usually composed of heavy chain variable region and light chain variable region of the antibody, which are linked by a linking short peptide (linker) with 15-25 amino acids.

In the present invention, the term "variable" means that certain parts of the variable region of an antibody differ in sequence, which forms the binding and specificity of various specific antibodies for their specific antigens. However, the variability is not evenly distributed throughout the variable region of the antibody. It is concentrated in three segments called complementarity determining regions (CDRs) or hypervariable regions in the light chain and heavy chain variable regions. The more conserved part of the variable region is called the frame region (FR). The variable regions of the natural heavy and light chains each contain four FR regions, which are roughly in a β-folded configuration, connected by the three CDRs that form the connecting loop, and in some cases may form a partly β folded structure. The CDRs in each chain get close through the FR regions and together with the CDRs of the other chain form the antigen-binding site of the antibody (see Kabat et al., NIH Publ. No. 91-3242, Volume I, pages 647-669 (1991)).

As used herein, the term "frame region (FR)" refers to amino acid sequences inserted between CDRs, i.e., those portions of the relatively conserved light and heavy chain variable regions of immunoglobulins between different immunoglobulins in a single species. The light and heavy chains of immunoglobulins each have four FRs, which are called FR1-L, FR2-L, FR3-L, FR4-L and FR1-H, FR2-H, FR3-H, FR4-H. Accordingly, the light chain variable domain can thus be called (FR1-L)-(CDR1-L)-(FR2-L)-(CDR2-L)-(FRR3-L)-(CDR3-L)-(FR4-L) and the heavy chain variable domain can thus be expressed as (FR1-H)-(CDR1-H)-(FR2-H)-(CDR2-H)-(FR3-H)-(FRR3-H)-(FR4-H). Preferably, the FR of the present invention is a human antibody FR or its derivatives, the derivative of the human antibody FR is substantially the same as the naturally occurring human antibody FR, i.e., sequence identity reaches 85%, 90%, 95%, 96%, 97%, 98% or 99%.

Knowing the amino acid sequences of the CDRs, those skilled in the art can easily determine the frame regions FR1-L, FR2-L, FR3-L, FR4-L and/or FR1-H, FR2-H, FR3-H, FR4-H.

As used herein, the term "human frame region" refers to a frame region that is substantially the same (about 85% or more, specifically 90%, 95%, 97%, 99% or 100%) as the naturally occurring human antibody frame region.

As used herein, the term "linker" refers to one or more amino acid residues inserted into the immunoglobulin domain to provide sufficient mobility for the domain of light and heavy chains to fold into exchange for dual variable domain immunoglobulins. In the present invention, the preferred linker refers to the Linker1 and Linker2, wherein Linker1 connects VH and VL of a single-chain antibody (scFv), and Linker2 is used to connect scFv with the heavy chain of another antibody.

Examples of suitable linkers include single glycine (Gly), or serine (Ser) residues, and the identification and sequence of amino acid residues in the linker may vary with the type of secondary structural element to be implemented in the linker.

In the present invention, the antibody of the present invention also includes conservative variants thereof, which means that compared with the amino acid sequence of the bispecific antibody of the present invention, there are at most 10, preferably at most 8, more preferably at most 5, most preferably at most 3 amino acids replaced by amino acids with the same or similar properties to form a polypeptide. These conservatively variant polypeptides are preferably produced by amino acid substitution according to Table A.

TABLE A

| Initial residue | Representative substitution | Preferred substitution |
|---|---|---|
| Ala (A) | Val; Leu; Ile | Val |
| Arg (R) | Lys; Gln; Asn | Lys |
| Asn (N) | Gln; His; Lys; Arg | Gln |
| Asp (D) | Glu | Glu |
| Cys (C) | Ser | Ser |
| Gln (Q) | Asn | Asn |
| Glu (E) | Asp | Asp |
| Gly (G) | Pro; Ala | Ala |
| His (H) | Asn; Gln; Lys; Arg | Arg |
| Ile (I) | Leu; Val; Met; Ala; Phe | Leu |
| Leu (L) | Ile; Val; Met; Ala; Phe | Ile |
| Lys (K) | Arg; Gln; Asn | Arg |
| Met (M) | Leu; Phe; Ile | Leu |
| Phe (F) | Leu; Val; Ile; Ala; Tyr | Leu |
| Pro (P) | Ala | Ala |
| Ser (S) | Thr | Thr |
| Thr (T) | Ser | Ser |
| Trp (W) | Tyr; Phe | Tyr |
| Tyr (Y) | Trp; Phe; Thr; Ser | Phe |
| Val (V) | Ile; Leu; Met; Phe; Ala | Leu |

In the present invention, the terms "anti", "binding", "specific binding" refers to a non-random binding reaction between two molecules, such as a reaction between an antibody and an antigen targeted thereto. Typically, antibody binds to its antigen with an equilibrium dissociation constant (KD) of less than about $10^{-7}$M, e.g., less than about $10^{-8}$M, $10^{-9}$M, $10^{-10}$M, $10^{-11}$M, or less. In the present invention, the term "KD" refers to the equilibrium dissociation constant of a particular antibody-antigen interaction, which is used to describe the binding affinity between the antibody and the antigen. The smaller the equilibrium dissociation constant is, the closer the antibody-antigen binding is and the higher the affinity between the antibody and the antigen is. For example, the binding affinity of an antibody to an antigen is determined using Surface Plasmon Resonance (SPR) in a BIACORE apparatus or the relative affinity of an antibody binding to an antigen is determined using ELISA.

In the present invention, the term "epitope" refers to a peptide determinant specifically binding to an antibody. The epitope of the present invention is the region of the antigen bound by the antibody.

The present invention also provides the polynucleotide molecule encoding the above-mentioned antibody or fragment thereof or fusion protein thereof. The polynucleotide of the present invention can be in a form of DNA or RNA. DNA forms include cDNA, genomic DNA, or synthetic DNA. DNA can be single stranded or double stranded. DNA can be the coding strand or the non-coding strand.

Once a relevant sequence is obtained, recombination methods can be used to obtain the relevant sequence in large quantities. This is usually carried out by cloning the sequence into a vector, transforming a cell with the vector, and then separating the relevant sequence from the proliferated host cell by conventional methods.

The present invention further relates to vectors comprising said suitable DNA sequences and suitable promoters or control sequences. These vectors can be used to transform suitable host cells to enable them to express protein.

Pharmaceutical Composition and Application

The present invention further provides a composition. Preferably, the composition is a pharmaceutical composition comprising the antibody above mentioned, or the active fragment thereof, or the fusion protein thereof, and a pharmaceutically acceptable carrier. In general, these substances may be formulated in a non-toxic, inert and pharmaceutically acceptable aqueous carrier medium, wherein the pH is generally about 5-8, preferably, pH is about 6-8, though the pH value may be varied depending on the nature of the substances to be formulated and the condition to be treated. The formulated pharmaceutical composition may be administered by conventional routes, including (but not limited to): intravenous injection, intravenous drip, subcutaneous injection, topical injection, intramuscular injection, intratumoral injection, intraperitoneal injection (e.g., intraperitoneal), intracranial injection, or intraluminal injection. In the present invention, the term "pharmaceutical composition" refers to the bispecific antibody of the present invention, may be combined with a pharmaceutically acceptable carrier to form a pharmaceutical formulation composition to exert efficacy more stably. These preparations can ensure the conformational integrity of the amino acid core sequence of the bispecific antibody disclosed in the present invention, while also protecting the protein multifunctional groups from degradation (including but not limited to coagulation, deamination or oxidation). The pharmaceutical composition according to the present invention comprises a safe and effective amount (e.g., 0.001-99 wt %, preferably 0.01-90 wt %, more preferably 0.1-80 wt %) of the bispecific antibody above mentioned according to the present invention (or a conjugate thereof) and a pharmaceutically acceptable carrier or excipient. Such carriers include (but are not limited to): saline, buffers, glucose, water, glycerol, ethanol, and a combination thereof. Pharmaceutical preparations should correspond to the administration modes. The pharmaceutical composition according to the present invention can be prepared in the form of an injection, for example, by a conventional method using physiological saline or an aqueous solution containing glucose and other adjuvants. A pharmaceutical composition, for example, an injection and a solution, should be prepared under aseptic conditions. The dosage of active ingredient is therapeutically effective amount, for example from about 10 microgram per kilogram body weight to about 50 milligrams per kilogram body weight per day. In addition, the bispecific antibody of the present invention may also be used in combination with an additional therapeutic agent.

When a pharmaceutical composition is used, a safe and effective amount of the bispecific antibody or immunoconjugate thereof is administered to a mammal, wherein the safe and effective amount is generally at least about 10 μg per kilogram of body weight, and in most cases, no more than about 50 mg per kilogram of body weight, preferably, the amount is from about 10 μg per kilogram of body weight to about 10 mg per kilogram of body weight. Of course, a specific amount should also depend on the factors such as administration route and physical conditions of a patient, which fall into the skills of skilled physicians.

Antibody-Drug Conjugate (ADC)

The present invention also provides an antibody-drug conjugate (ADC) based on the antibody according to the present invention.

Typically, the antibody-drug conjugate comprises the antibody and an effector molecule, wherein the antibody is conjugated to the effector molecule, and chemical conjugation is preferred. Preferably, the effector molecule is a therapeutically active drug. In addition, the effector molecule may be one or more of a toxic protein, a chemotherapeutic drug, a small-molecule drug or a radionuclide.

The antibody according to present invention and the effector molecule may be coupled by a coupling agent. Examples of the coupling agent may be any one or more of a non-selective coupling agent, a coupling agent utilizing a carboxyl group, a peptide chain, and a coupling agent utilizing a disulfide bond. The non-selective coupling agent refers to a compound that results in a linkage between an effector molecule and an antibody via a covalent bond, such as glutaraldehyde, etc. The coupling agent utilizing a carboxyl group may be any one or more of a cis-aconitic anhydride coupling agent (such as cis-aconitic anhydride) and an acyl hydrazone coupling agent (the coupling site is acyl hydrazone).

Certain residues on an antibody (such as Cys or Lys, etc.) are used to link a variety of functional groups, including imaging agents (such as chromophores and fluorophores), diagnostic agents (such as MRI contrast agents and radioisotopes), stabilizers (such as ethylene glycol polymer) and therapeutic agents. An antibody can be conjugated to a functional agent to form a conjugate of the antibody-functional agent. A functional agent (e.g., a drug, a detection reagent, a stabilizer) is conjugated (covalently linked) to an antibody. A functional agent can be linked to an antibody either directly or indirectly via a linker.

Antibodies can be conjugated to drugs to form antibody-drug conjugates (ADCs). Typically, an ADC comprises a linker between a drug and an antibody. The linker can be a degradable or non-degradable linker. Typically, degradable linkers are easily degraded in an intracellular environment, for example, the linker is degraded at the target site, thereby releasing the drug from the antibody. Suitable degradable linkers include, for example, enzyme-degradable linkers, including peptidyl-containing linkers that can be degraded by intracellular protease (e.g., lysosomal protease or endosomal protease), or sugar linkers, for example, glucuronide-containing linkers that can be degraded by glucuronidase. Peptidyl linkers may include, for example, dipeptides, such as valine-citrulline, phenylalanine-lysine or valine-alanine. Other suitable degradable linkers include, for example, pH sensitive linkers (e.g., linkers that are hydrolyzed at a pH of below 5.5, such as hydrazone linkers) and linkers that are degraded under reducing conditions (e.g. disulfide-bond linkers). A non-degradable linker typically releases a drug under conditions that the antibody is hydrolyzed by protease.

Prior to linkage to an antibody, a linker has a reactive group capable of reacting with certain amino acid residues, and the linkage is achieved by the reactive group. A thiol-specific reactive group is preferred, and includes, for example, a maleimide compound, a halogenated (e.g. iodo-, bromo- or chloro-substituted) amide; a halogenated (e.g. iodo-, bromo- or chloro-substituted) ester; a halogenated (e.g. iodo-, bromo- or chloro-substituted) methyl ketone, a benzyl halide (e.g. iodide, bromide or chloride); vinyl sulfone, pyridyl disulfide; a mercury derivative such as 3,6-di-(mercurymethyl)dioxane, wherein the counter ion is $CH_3COO^-$, $Cl^-$ or $NO_3^-$; and polymethylene dimethyl sulfide thiosulfonate. The linker may include, for example, a maleimide linked to an antibody via thiosuccimide.

A drug may be any cytotoxic, cytostatic or immunosuppressive drug. In an embodiment, an antibody is linked to a drug via a linker, and the drug has a functional group that can form a bond with the linker. For example, a drug may have an amino group, a carboxyl group, a thiol group, a hydroxyl group, or a ketone group that can form a bond with a linker. When a drug is directly linked to a linker, the drug has a reactive group before being linked to an antibody.

Useful drugs include, for example, anti-tubulin drugs, DNA minor groove binding agents, DNA replication inhibitors, alkylating agents, antibiotics, folic acid antagonists, antimetabolites, chemotherapy sensitizers, topoisomerase inhibitors, vinca alkaloids, etc. In the present invention, a drug-linker can be used to form an ADC in a simple step. In other embodiments, a bifunctional linker compound can be used to form an ADC in a two-step or multi-step process. For example, a cysteine residue reacts with the reactive moiety of a linker in the first step, and then the functional group on the linker reacts with a drug in the subsequent step, so as to form an ADC.

In general, the functional group on a linker is selected so that it can specifically react with the suitable reactive group on a drug moiety. As a non-limiting example, an azide-based moiety can be used to specifically react with the reactive alkynyl group on a drug moiety. The drug is covalently bound to the linker by 1,3-dipolar cycloaddition between the azide and alkynyl group. Other useful functional groups include, for example, ketones and aldehydes (suitable for reacting with hydrazides and alkoxyamines), phosphines (suitable for reacting with azides); isocyanates and isothiocyanates (suitable for reacting with amines and alcohols); and activated esters, for example, N-hydroxysuccinimide esters (suitable for reacting with amines and alcohols). These and other linkage strategies, for example, those described in Bioconjugation Technology (2nd Edition (Elsevier)), are well known to those skilled in the art. Those skilled in the art could understand that when a complementary pair of reactive functional groups is selected for a selective reaction between a drug moiety and a linker, each member of the complementary pair can be used for the linker, and can also be used for the drug.

The present invention further provides a method for preparing an ADC, which may further comprise: under conditions sufficient to form an antibody-drug conjugate (ADC), combining an antibody to a drug-linker compound.

In certain embodiments, the method of the present invention comprises: under conditions sufficient to form an antibody-linker conjugate, combining an antibody to a bifunctional linker compound. In these embodiments, the method of the present invention further comprises: under conditions sufficient to covalently link the drug moiety to the antibody via a linker, combining the antibody-linker conjugate to the drug moiety.

In some embodiments, an antibody-drug conjugate (ADC) has a formula as follows:

wherein,
Ab is an antibody,
LU is a linker;
D is a drug;
and the subscript p is a value selected from 1 to 8.

The following embodiments are further descriptions of the present invention and should not be understood as limitations of the present invention. Examples do not include a detailed description of traditional methods, such as those methods for constructing vectors and plasmids, methods for inserting genes encoding proteins into such vectors and plasmids, or methods for introducing plasmids into host cells. Such methods are well known to those with ordinary skills in the art and have been described in numerous publications, including Sambrook, J., Fritsch, E. F. and Maniais, T. (1989) Molecular Cloning: A Laboratory Manual, 2nd edition, Cold spring Harbor Laboratory Press. Unless otherwise stated, percentages and parts are calculated by weight.

The experimental materials and sources used in the following embodiments and the preparation methods of the experimental reagents are described below.

Experimental Materials:
CHO-S Cells: purchased from Thermo Fisher Scientific.
Recombinant cell line CHOS-CD38: Human full-length CD38 was stably transfected into CHO-S cells to obtain a monoclonal cell line expressing CD38 stably by clone screening.
Raji cells: purchased from ATCC, CCL-86.
Mouse myeloma cells SP2/0: purchased from ATCC, catalog number CRL-1581.
Balb/c mice: purchased from Shanghai Lingchang Biotechnology Co., Ltd.
CB-17 SCID mice: purchased from Shanghai Lingchang Biotechnology Co., Ltd.
Ramos Cells: purchased from ATCC, catalog number CRL-1596.
Daudi cells: purchased from ATCC, catalog number CCL-213.
DND-41 cells: purchased from Fenghui Biotechnology.
Human peripheral blood mononuclear cell PBMC: purchased from Ausails Biotechnology (Shanghai) Co., Ltd.
Reverse Transcription Kit: purchased from Takara.
Goat anti-mouse secondary antibody: purchased from Millipore, catalog number AP181P.
Donkey anti-mouse PE fluorescent secondary antibody: purchased from Jackson, catalog number 715-116-150.
Goat anti-human PE fluorescent secondary antibody: purchased from Jackson, catalog number 109-115-098
F16 Black Maxisorp Plate: purchased from Nunc, catalog number 475515.

Experimental Reagents:
PBS buffer: Sangon Biotech (Shanghai) Co., Ltd., catalog number B548117-0500.
SFM Medium: purchased from Thermo Fisher Scientific, Inc., catalog number 12045-076.
TMB: purchased from BD Company, catalog number 555214.
NGD: purchased from sigma, catalog number N5131-25MG.
Bovine serum albumin (BSA): purchased from Fetal Bovine Serum.
β-mercaptoethanol, fetal bovine serum, glutamine, sodium pyruvate, MEM-NEAA, 1% Penicillin-streptomycin were all purchased from Gibco.
Phenol-free RPMI-1640: purchased from Gibco, catalog number 11835055.
CytoTox 96 Non-Radioactive Cytotoxicity Assay: purchased from Promega, catalog number: G1780.
HAT: purchased from Sigma-Alhrich, catalog number H0262-10VL.
CCK-8: purchased from Tongren Chemical, catalog number CK04.
Trizol: purchased from Thermo Fisher Scientific, catalog number 15596018.

Experimental Instruments:
Electrofusion Instrument: purchased from BTX.
Flow cytometry (CytoFLEX Cytometer System): purchased from Beckman Coulter.
Antibody Sequences of the present invention are as follows:

| Name | Sequence | SEQ ID NO. |
|---|---|---|
| H-CDR1 of CD38 antibody | TYWMQ | 1 |
| H-CDR2 of CD38 antibody | AIYPGDGDITYNQKFKG | 2 |
| H-CDR3 of CD38 antibody | EGYYYGGALDY | 3 |
| L-CDR1 of CD38 antibody | TASSSVSSSYLH | 4 |
| L-CDR2 of CD38 antibody | GTSNLAS | 5 |
| L-CDR3 of CD38 antibody | HRYHRSPWT | 6 |
| CD38 antibody heavy chain variable region 50G12-VH | QVQLQQSGAELARPGASVKLSCKASGYTENTY WMQWVKQRPGQGLEWIGAIYPGDGDITYNQKF KGKATLTADKSSNTAYMHLSSLASEDSAVYYCA REGYYYGGALDYWGQGTSVTVSS | 7 |
| CD38 antibody light chain variable region 50G12-VL | QIFLTQSPAIMSASLGERVTMTCTASSSVSSSYLH WYQQKPGSSPPKLWMYGTSNLASGVPPRFSGSGS GTSYSLTISSMEAEDAATYYCHRYHRSPWTFGG GTKLEIK | 8 |
| CD38 humanized antibody heavy chain variable region 50G12-Hu-VH | QVQLVQSGAEVKKPGASVKVSCKASGYTFNTY WMQWVRQAPGQGLEWMGAIYPGDGDITYNQK FKGRVTLTADKSTSTVYMELSSLRSEDTAVYYCA REGYYYGGALDYWGQGTLVTVSS | 9 |
| CD38 humanized antibody light chain variable region 50G12-Hu-VL | DIQMTQSPSSLSASVGDRVTITCTASSSVSSSYLH WYQQKPGKAPKLWMYGTSNLASGVPSRFSGSG SGTDYTLTISSLQPEDFATYYCHRYHRSPWTFGQ GTKVEIK | 10 |
| CD38 humanized antibody heavy chain 50G12-Hu-HC | QVQLVQSGAEVKKPGASVKVSCKASGYTENTY WMQWVRQAPGQGLEWMGAIYPGDGDITYNQK FKGRVTLTADKSTSTVYMELSSLRSEDTAVYYCA REGYYYGGALDYWGQGTLVTVSSASTKGPSVFP LAPSSKSTSGGTAALGCLVKDYFPEPVTVSWNSG ALTSGVHTFPAVLQSSGLYSLSSVVTVPSSSLGTQ TYICNVNHKPSNTKVDKKVEPKSCDKTHTCPPC PAPELLGGPSVFLFPPKPKDTLMISRTPEVTCVVV DVSHEDPEVKFNWYVDGVEVHNAKTKPREEQY NSTYRVVSVLTVLHQDWLNGKEYKCKVSNKAL PAPIEKTISKAKGQPREPQVYTLPPSREEMTKNQ VSLTCLVKGFYPSDIAVEWESNGQPENNYKTTPP VLDSDGSFFLYSKLTVDKSRWQQGNVFSCSVMH EALHNHYTQKSLSLSPGK | 11 |
| CD38 humanized antibody light chain 50G12-Hu-LC | DIQMTQSPSSLSASVGDRVTITCTASSSVSSSYLH WYQQKPGKAPKLWMYGTSNLASGVPSRFSGSG SGTDYTLTISSLQPEDFATYYCHRYHRSPWTFGQ GTKVEIKRTVAAPSVFIFPPSDEQLKSGTASVVCL LNNFYPREAKVQWKVDNALQSGNSQESVTEQD SKDSTYSLSSTLTLSKADYEKHKVYACEVTHQG LSSPVTKSFNRGEC | 12 |
| 50G12-VH heavy chain variable region nucleotide sequence | caggttcagctccagcagtctggggctgagctggcaagacctggggcctc agtgaagttg60tcctgcaaggcttctggctacacctttaatacctattggatg cagtgggtaaaacagaggcctggacagggtctggaatggattgggctatt tatcctggagatggtgatattacatataatcagaagtttaagggcaaggccac attgactgcagataaatcttccaacacagcctacatgcacctcagcagcttgg catctgaggactcagcggtctattactgtgcaagagggatattattacggc ggggctttggactactggggtcaaggaacctcagtcaccgtctcctca | 13 |

-continued

| Name | Sequence | SEQ ID NO. |
|---|---|---|
| 50G12-VL light chain variable region nucleotide sequence | caaattttctcacccagtctccagcaatcatgtctgcatctctaggggaacgg gtcaccatgacctgcactgccagctcaagtgtgagttcaagctacttgcactg gtaccagcagaagccaggatccccccccaaactctggatgtatggcacatc caacctggcttctggagtcccacctcgcttcagtggcagtggtctgggacc tcttactctctcacaatcagcagcatggaggctgaagatgctgccacttattac tgccaccggtatcatcgttccccgtggacgttcggtggaggcaccaagctg gaaatcaaa | 14 |
| 50G12-Hu-VH heavy chain variable region nucleotide sequence | caggtgcagctcgtgcagtccggcgctgaggtgaagaagcccggcgcctc cgtgaaggtgtcctgcaaggcctccggctacaccttcaacaccattggatg caatgggtgaggcaggcccccggccagggcctggagtggatgggcgcc atctaccccggcgatggcgacatcacctacaaccagaagtttaagggcagg gtgaccctgacagctgataaatctacatctactgtgtacatggagttatcttctc tgagatctgaggatacagctgtgtactattgtgctagagagggatactattatg gcggagccctggattattggggacagggaacactggtgacagtgtcttct | 15 |
| 50G12-Hu-LC light chain variable region nucleotide sequence | gatatccagatgacccagtctcctcttcccctgtccgcttctgtgggagataga gtgacaattacatgtaccgcttcttcttctgtgtcttcttcttacctgcattggtatc agcagaagcctggcaaggctcctaaactgtggatgtatggaacatctaatct ggcttctggcgtgccttctagattttctggctctggatctggcaccgattacac actgaccatctctagcctgcagcctgaggattttgccacatactactgtcaca gatatcacagatctccttggacctttggccagggcaccaaggtggagatcaa g | 16 |
| 50G12-Hu-HC heavy chain nucleotide sequence | caggtgcagctcgtgcagtccggcgctgaggtgaagaagcccggcgcctc cgtgaaggtgtcctgcaaggcctccggctacaccttcaacaccattggatg caatgggtgaggcaggcccccggccagggcctggagtggatgggcgcc atctaccccggcgatggcgacatcacctacaaccagaagtttaagggcagg gtgaccctgacagctgataaatctacatctactgtgtacatggagttatcttctc tgagatctgaggatacagctgtgtactattgtgctagagagggatactattatg gcggagccctggattattggggacagggaacactggtgacagtgtcttctg cgagcaccaagggaccttccgtgtttcccctcgccccccagctccaaaagca ccagcggcggaacagctgctctcggctgtctcgtcaaggattacttccccga gcccgtgaccgtgagctggaacagcggagccctgacaagcggcgtccac accttccctgctgtcctacagtcctccggactgtacagcctgagcagcgtggt gacagtccctagcagctccctgggcacccagacatatatttgcaacgtgaat cacaagcccagcaacaccaaggtcgataagaaggtggagcctaagtcctg cgacaagacccacacatgtccccctgtcccgctcctgaactgctgggagg ccctt ccgtgttcctgttccccctaagcccaaggacaccctgatgatttcca ggacacccgaggtgacctgtgtggtggtggacgtcagccacgaggacccc gaggtgaaattcaactggtacgtcgatggcgtggaggtgcacaacgctaag accaagcccagggaggagcagtacaattccacctacagggtggtgtccgt gctgaccgtcctccatcaggactggctgaacggcaaagagtataagtgcaa ggtgagcaacaaggcccctcctgctcccatcgagaagaccatcagcaaag ccaagggccagcccagggaacctcaagtctataccctgcctcccagcagg gaggagatgaccaagaaccaagtgagcctcacatgcctcgtcaagggcttc tatccttccgatattgccgtcgagtgggagtccaacggacagcccgagaac aactacaagacaacacccccgtgctcgattccgatggcagcttcttcctgta ctccaagctgaccgtggacaagtccagatggcaacaaggcaacgtcttcag ttgcagcgtcatgcatgaggccctccacaaccactacacccagaagagcct ctccctgagccctggaaag | 17 |
| 50G12-Hu-HC light chain nucleotide sequence | gatatccagatgacccagtctcctcttcccctgtccgcttctgtgggagataga gtgacaattacatgtaccgcttcttcttctgtgtcttcttcttacctgcattggtatc agcagaagcctggcaaggctcctaaactgtggatgtatggaacatctaatct ggcttctggcgtgccttctagattttctggctctggatctggcaccgattacac actgaccatctctagcctgcagcctgaggattttgccacatactactgtcaca gatatcacagatctccttggacctttggccagggcaccaaggtggagatcaa gagaaccgtcgccgctcccagcgtcttcatcttccccccagcgatgagca gctgaagagcggaaccgccagcgtggtgtgcctgctgaacaacttctaccc cagggaggccaaggtgcaatggaaggtggacaacgccctacagagcgg caactcccaggagagcgtgaccgagcaggacagcaaggatagcaccta cagcctgagcagcaccctcaccctgagcaaggccgactacgagaagcaca aggtgtacgcctgcgaggtgacccatcagggcctgagcagccctgtgacc aagagcttcaacaggggcgagtgc | 18 |
| Daratumumab heavy chain variable region amino acid sequence | EVQLLESGGGLVQPGGSLRLSCAVSGFTFNSFAM SWVRQAPGKGLEWVSAISGSGGGTYYADSVKG RFTISRDNSKNTLYLQMNSLRAEDTAVYFCAKD KILWFGEPVFDYWGQGTLVTVSS | 19 |

-continued

| Name | Sequence | SEQ ID NO. |
|---|---|---|
| Daratumumab light chain variable region amino acid sequence | EIVLTQSPATLSLSPGERATLSCRASQSVSSYLAW YQQKPGQAPRLLIYDASNRATGIPARFSGSGSGT DFTLTISSLEPEDFAVYYCQQRSNWPPTFGQGTK VEIK | 20 |
| Isatuximab heavy chain variable region amino acid sequence | QVQLVQSGAEVAKPGTSVKLSCKASGYTFTDYW MQWVKQRPGQGLEWIGTIYPGDGDTGYAQKFQ GKATLTADKSSKTVYMHLSSLASEDSAVYYCAR GDYYGSNSLDYWGQGTSVTVSS | 21 |
| Isatuximab light chain variable region amino acid sequence | DIVMTQSHLSMSTSLGDPVSITCKASQDVSTVVA WYQQKPGQSPRRLIYSASYRYIGVPDRFTGSGA GTDFTFTISSVQAEDLAVYYCQQHYSPPYTFGGG TKLEIK | 22 |

Example 1 Preparation of a Positive Control Antibody

The heavy chain and light chain variable region amino acid sequences of Daratumumab described in examples of the present invention are from the *WHO Drug Information*, Vol. 24, No. 1, 2010, i.e., SEQ ID NO: 19 and 20 of the present invention.

The heavy chain and light chain variable region amino acid sequences of Isatuximab described in examples of the present invention are from *WHO Drug Information*, Vol. 29, No. 3, 2015, i.e., SEQ ID NO: 21 and 22 of the present invention.

The DNA sequences of above-mentioned heavy and light chain variable regions were synthesized by Sangon Biotech (Shanghai) Co., Ltd. The synthesized Daratumumab heavy chain variable region gene was linked to the human IgG1 heavy chain constant region gene to obtain a full-length heavy chain gene, named Daratumumab-HC-IgG1. The Daratumumab light chain variable region gene was linked to the human Kappa chain constant region gene to obtain a full-length light chain gene, named Daratumumab-LC. Daratumumab-HC-IgG1 and Daratumumab-LC genes were constructed into pcDNA3.4 expression vectors, and the obtained heavy and light chain expression vectors were transferred into HEK293F cells to express antibodies by PEI transfection, and HEK293F cells were cultured with Free Style 293 Expression Medium. The transfected HEK293F cells were cultured in a $CO_2$ shaking incubator for 5 days, then the cell supernatant was collected by centrifugation, and the antibody in the supernatant was purified by Protein A affinity chromatography, and the antibody obtained was named Daratumumab. In addition, antibody Isatuximab was obtained with similar experimental methods.

Human CD38 extracellular segment sequence information is from https://www.uniprot.org/uniprot/P28907. The DNA of CD38 extracellular segment was synthesized by Sangon Biotech (Shanghai) Co., Ltd. The recombinant gene was constructed into the pcDNA3.4 expression vector. The recombinant protein expressed by His tag fusion was purified by metal chelation affinity chromatography column for one-step purification of the recombinant protein in the cultured supernatant. Fc tag fusion-expressed recombinant proteins were purified in one step using Protein A/G affinity chromatography columns. The obtained protein was named CD38-His/CD38-Fc.

Example 2 Antigen-Immuned Animals and Preparation and Screening of Hybridomas Step 1: Antigen-Immunized Mice Balb/c mice were immunized by routine intraperitoneal injection with recombinant overexpressed cell line CHOS-CD38 or tumor cell line Raji. On the first day, Balb/c mice were injected intraperitoneally with 100 μl of Freund's complete adjuvant. On the second day, Balb/c mice were intraperitoneally immunized with recombinant cell line CHOS-CD38 or Raji cells, $5*10^6$ cells per mouse. On the 14th day, Balb/c mice were intraperitoneally injected for boosting immunization with recombinant cell line CHOS-CD38 or Raji cells, $5*10^6$ cells per mouse, and on the 36th day, mice were immunized with recombinant cell line CHOS-CD38 or Raji cells as before. Three weeks later, CD38-His antigen protein was injected intraperitoneally for stimulation. After 3-4 days, mouse spleens were taken for cell fusion experiment.

Step 2: Preparation and Screening of Hybridomas 3-4 days after the last immunization of mice, mouse spleen cells and mouse myeloma cells SP2/0 were fused by electrofusion apparatus using conventional hybridoma technique protocols. The fused cells were uniformly suspended in complete medium, which consisting of 1:1 mixture of RPMI1640 and DMEM F12 medium and adding 1% Glutamine, 1% Sodium pyruvate, 1% MEM-NEAA (minimum basic medium—non-essential amino acid solution), 1% Penicillin-streptomycin, 50 μM of β-mercaptoethanol and 20% FBS (fetal bovine serum). The fused cells were divided into 36 96-well plates at $10^5$ cells/100/well and cultured overnight. The next day, 100 μl of complete medium containing 2×HAT were added to each well, so that the culture medium in the 96-well plate was 200 μl/well (containing 1×HAT). After 7-12 days, the supernatant was harvested and hybridoma wells with positive CD38 binding activity were screened by Cell based ELISA.

Wherein, the Cell based ELISA method for screening hybridoma wells with positive CD38 binding activity was as follows: the recombinant cell line CHOS-CD38 was diluted to $2*10^6$ cells/ml with PBS buffer, and was added into cell culture plate at 100 μl/well, and cultured overnight at 37° C. On the next day, the supernatant was removed, 100 μl/well cell fixative was added and fixed at room temperature for one hour, and then the supernatant was removed and 5% skim milk powder was added to block for two hours at 37°

C. The plate was washed with PBST once for use. The collected hybridoma supernatant was added into the blocked plate sequentially, 100 µl/well, and the plate was placed at 37° C. for 1h. The plate was washed with PBST for 3 times, and the HRP-labeled goat anti-mouse IgG was added and the plate placed at 37° C. for 30 min. After washing the plate with PBST for 5 times, the plate was patted on the absorbent paper to remove residual droplets as far as possible. 100 µl TMB was added to each well, and the plate was placed at room temperature (20±5° C.) for 5 minutes away from light; 50 µ2M $H_2SO_4$ terminating solution was added to each well to terminate the substrate reaction. OD values were read at 450 nm on the microplate reader to analyze the binding ability of the antibody to target antigen CD38. A total of 30 hybridoma cell lines were obtained through screening. The 30 hybridoma cell lines obtained through screening were expanded in serum-containing complete medium, and centrifuged to replace the medium with serum-free medium SFM medium so that the cell density was $1-2\times10^7$/ml. The cells were cultured at 8% $CO_2$ and 37° C. for 1 week. The supernatant was obtained by centrifugation and purified by Protein G affinity chromatography. Three strains of monoclonal antibody against human CD38 were obtained, named 50G12, 279D11, 153F11, and 50G12 was the best active antibody.

Example 3 Binding Activity of Murine Antibody 50G12 to Human CD38-Fc Protein

The binding ability of murine antibody to human CD38-Fc protein was determined by indirect enzyme-linked immunosorbent assay (ELISA). The specific methods were as follows: CD38-Fc protein was diluted in coating solution (50 mM carbonate coating buffer, pH 9.6) to 1 µg/ml to coat plate at 4° C. overnight. Then the plate was blocked with 5% skim milk and incubated at 37° C. for 2 hours. After washing the plate with PBST for 3 times, the anti-human CD38 antibody 50Ga12 protein prepared in the laboratory was diluted by gradient with 1% BSA buffer and added into the pre-coated CD38-FC plate with 100 µl/well, and incubated at 37° C. for 1 hour. The plate was washed with PBST for 3 times, and the HRP-labeled goat anti-mouse IgG was added and placed at 37° C. for 30 min. After washing the plate with PBST for 3 times, the plate was patted on the absorbent paper to remove residual droplets as far as possible. 100 µl TMB was added to each well, and then the plate was placed at room temperature (20±5° C.) away from light for 5 min. Then 50 µl 2M $H_2SO_4$ terminating solution was added to each well to terminate the substrate reaction. OD values were read at 450 nm on the microplate reader to analyze the binding ability of the tested antibody to the target antigen human CD38-Fc. The results are shown in FIG. 1.

As shown in FIG. 1, murine antibodies 50G12, 279D11 and 153F11 have good binding activity with target antigen CD38-Fc, and 50G12 has the best binding activity, with EC50 of 0.1727 nM.

Example 4 the Ability of Murine Antibodies to Inhibit CD38 Enzyme Activity

CD38 is an enzyme that catalyzes the conversion of nicotinamide guanine dinucleotide (NGD) into cyclic GDP-ribose, which is capable of stimulating fluorescence. The inhibitory effects of murine antibodies 50G12, 279D11, 153F11 and control antibodies Daratumumab, Isatuximab and IgG control on CD38 enzyme activity were determined by fluorescence method. The specific methods were as follows:

The murine antibodies 50G12, 279D11, 153F11 to be tested and the control antibodies Daratumumab, Isatuximab and IgG control were diluted to 600 µg/ml with Tris-Hcl, and a gradient dilution was performed by 3 times with a total of 10 wells. CD38-His antigen was diluted to 5 g/ml with Tris-Hcl, and the antigen and sample antibody were added to the reaction plate in equal volumes with 50 µl each. The plate was shaken for 10 min, and incubated at 37° C. for 30 min. The background wells were set: (1) diluent well: 200 µl diluent; (2) NGD wells: 100 µl diluent; (3) antigen well: 50 µl antigen, 150 µl diluent. After incubation, the NGD was diluted with Tris-Hcl to 250 µg/ml, 100 µl per well, except for diluent and antigen wells. The plate was shaken for 5 min, and incubated at 37° C. for 90 min. The plate was read at Ex:300, EM:410 with a multifunction microplate reader and data were collected and processed. The results are shown in FIG. 2.

Figure 2:
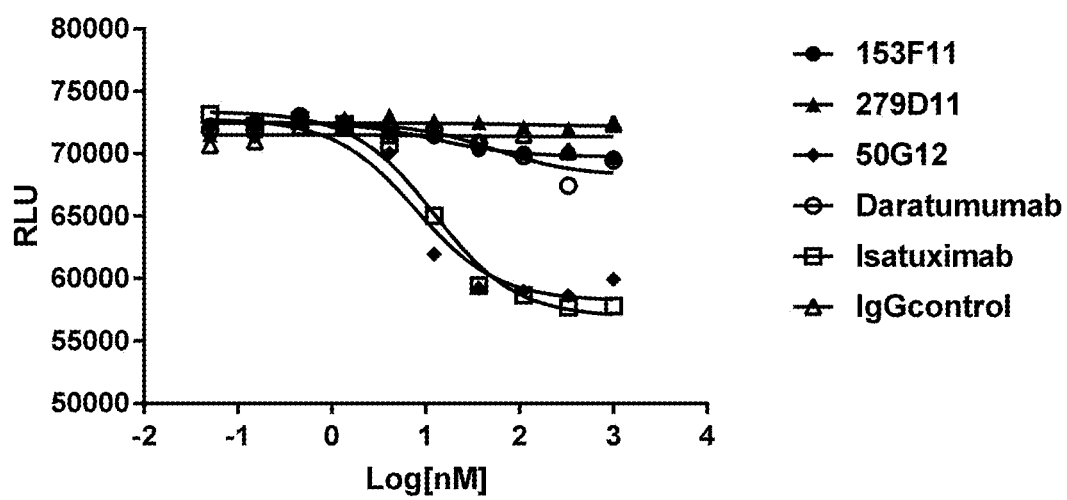
FIG. 2: Murine antibodies block CD38 cyclase activity

As shown in FIG. 2, only murine antibody 50G12 and Isatuximab can effectively block CD38 cyclase activity.

Example 5 the Binding Ability of Murine Antibodies to Recombinant High-Expression Cell Line CHOS-CD38 Cells and Tumor Cell Line DND-41 Cells Flow cytometry was used to detect the binding activity of murine antibodies to recombinant high-expression cell line CHOS-CD38 cells and tumor cell line DND-41 cells. The specific methods were as follows:

CHOS-CD38 and DND-41 cells were collected, centrifuged to remove the cell culture medium, and the cells were washed twice with PBS buffer. The cells were counted and diluted with 1% BSA FACS buffer to $2*10^6$ cells/ml. The cells were spread into round-bottom 96-well plate for use. The antibody to be tested was diluted with 1% BSA buffer for 8 gradients and added to the round-bottom plate with the above cells. The plate was incubated at 4° C. for 1 hour. After centrifugation, the supernatant was removed and the plate was washed 3 times with 1% BSA FACS buffer. 100 µl donkey anti-mouse PE fluorescent secondary antibody or goat anti-human PE fluorescent secondary antibody was added to each well at a ratio of 1:300 (see the instructions for fluorescent secondary antibody for details), and the plate was incubated at 4° C. for 1 hour. The samples were washed for 3 times with 1% BSA FACS buffer and then re-suspended with 1% BSA FACS buffer at 200 µl/well. FACScalibur BD was used to analyze the samples. The results of antibody binding to cells are shown in FIG. 3A and FIG. 3B.

Figure 3A:
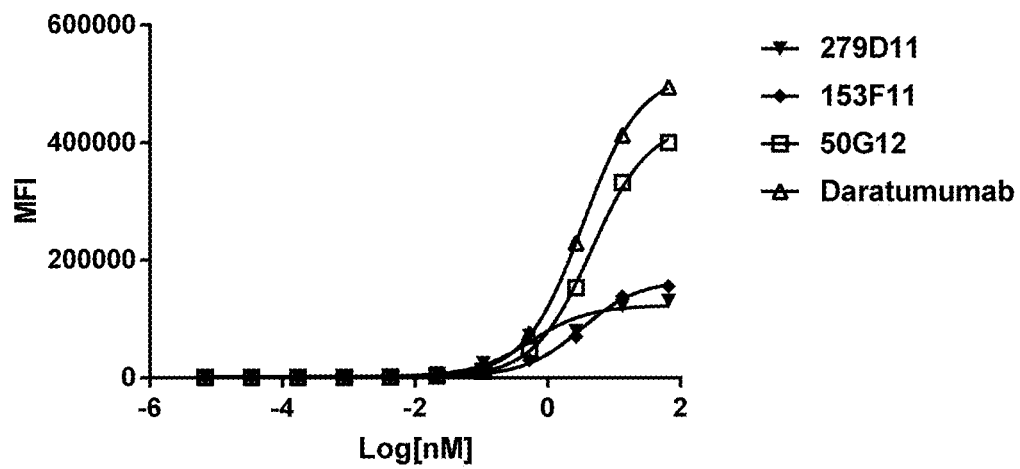
FIG. 3A: Binding activity of murine antibodies to recombinant high-expression cell line CHOS-CD38 cells
Figure 3B:
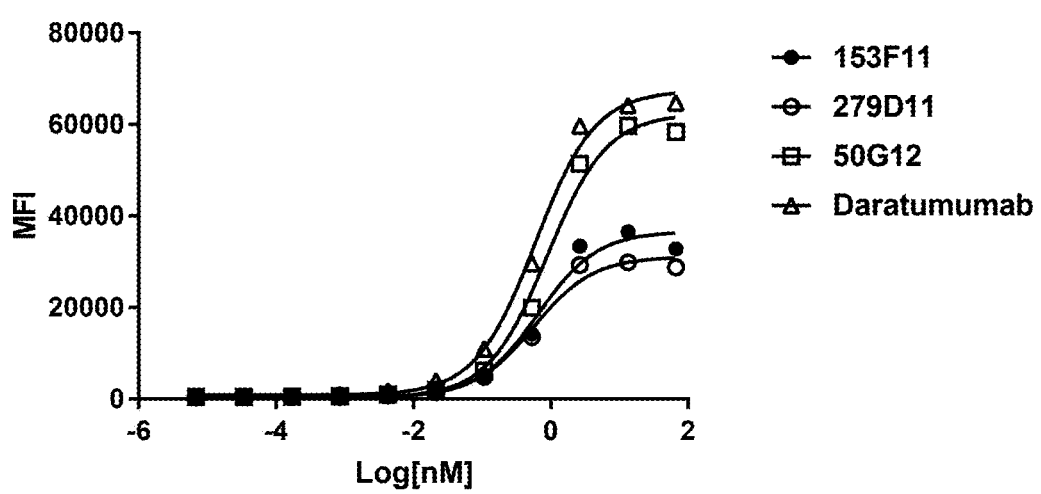
FIG. 3B: Binding activity of murine antibodies to tumor cell line DND-41 cells
Figure 4A:
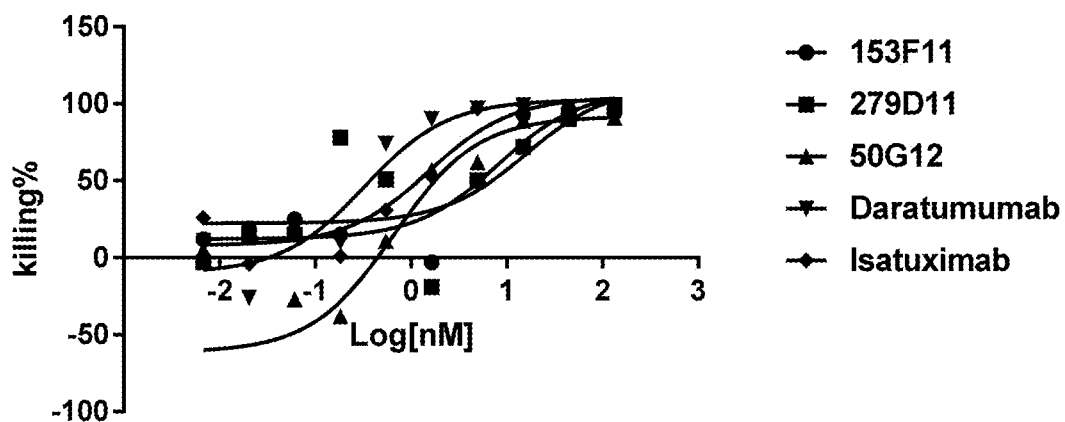
FIG. 4A: CDC activity of murine antibodies on CHOS-CD38 cells
Figure 4B:
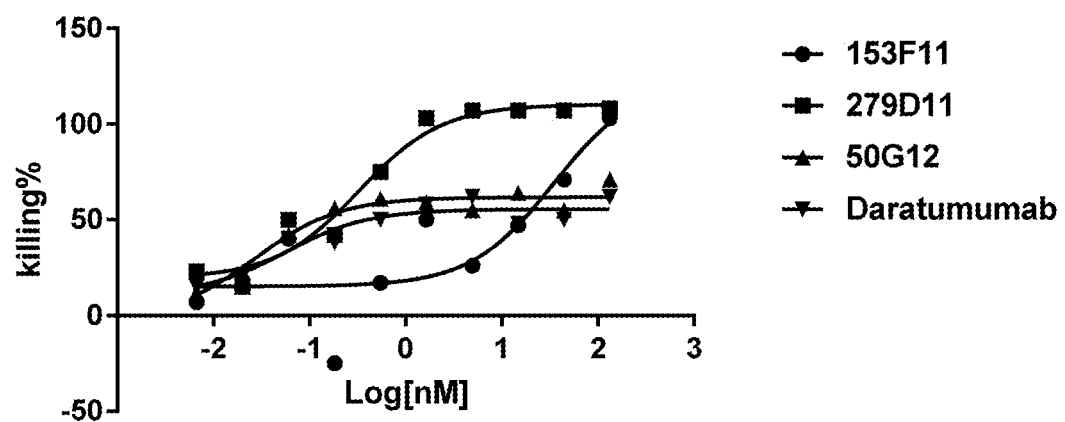
FIG. 4B: CDC activity of murine antibodies on Raji cells
Figure 4C:
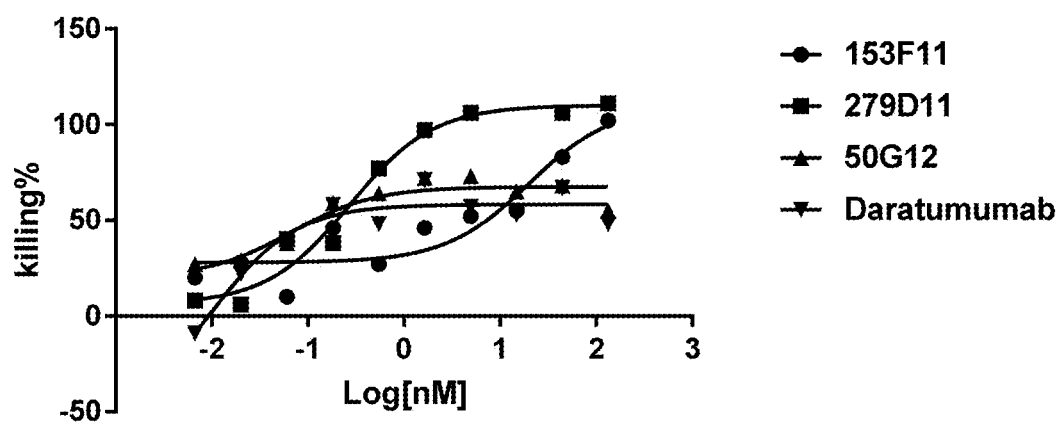
FIG. 4C: CDC activity of murine antibodies on DND-41 cells
Figure 4D:
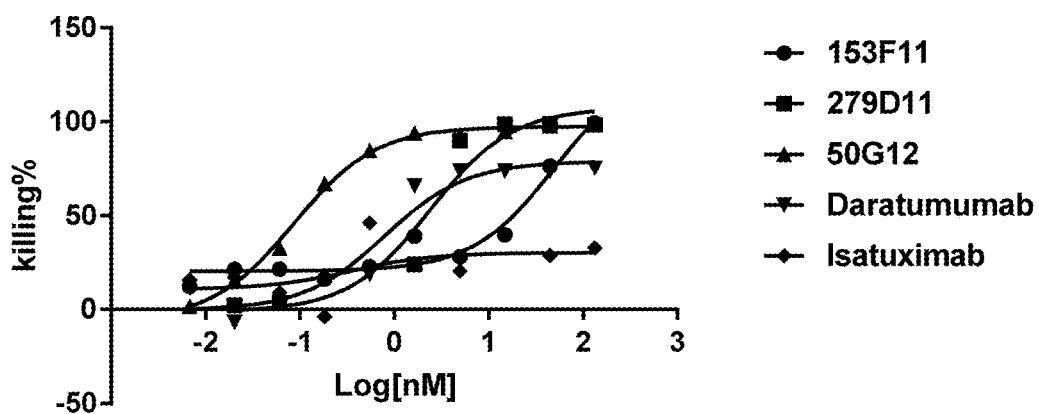
FIG. 4D: CDC activity of murine antibodies on Ramos cells
Figure 4E:
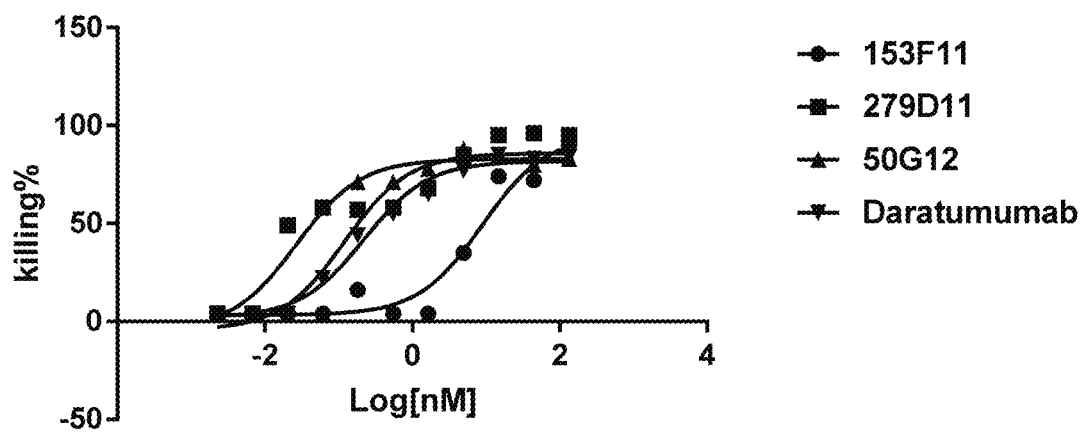
FIG. 4E: CDC activity of murine antibodies on Daudi cells

It can be seen from FIG. 3A and FIG. 3B that murine antibodies 50G12, 279D11 and 153F11 have good binding activity with CHOS-CD38 and DND-41 cells. $EC_{50}$ is 686.9 ng/ml, 84.9 ng/ml, and 488.9 ng/ml on CHOS-CD38 cells, respectively. $EC_{50}$ is 133.8 ng/ml, 84.44 ng/ml, and 96.89 ng/ml on DND-41 cells, respectively.

Example 6: Murine Antibody CDC Activity Assay

When a specific antibody binds to the corresponding antigen on the cell membrane surface, it can activate the classical complement pathway, thereby forming a membrane attack complex to lyse target cells, which is called CDC action. CDC activity was measured on CHOS-CD38, Raji, DND-41, Ramos, and Daudi cells with the following specific methods:

Anti-human CD38 monoclonal antibody was diluted to the initial concentration of 20 μg/ml using cell culture medium as buffer, and then diluted with a 3-fold concentration gradient to obtain a total of 8 concentrations of dilution. Target cells expressing CD38 (Daudi cells, etc.) were counted and resuspended to $3*10^5$ cells/ml. 100 μl of anti-human CD38 monoclonal antibody of various concentration dilutions and 80 μl of high-expression CD38 target cells were pre-incubated for 15 min, then 20 μl of 50% fresh human serum (donated by volunteers) was added and mixed. Positive control well was target cells alone added with serum, while the negative control hole was cell-free medium. The cells were incubated in the incubator for 12-18h. After adding 20 μl CCK-8 for 4h, microplate reader was used to measure the absorption value at 450 nm, and the killing rate was calculated according to the reading at 450 nm. The formula for calculating the killing rate is:

Killing rate (killing %)=(positive control absorption value−experimental group absorption value)/ (positive control absorption value−negative control absorption value)*100.

The results are shown in FIG. 4A, FIG. 4B, FIG. 4C, FIG. 4D, FIG. 4E. On different cell models, murine antibodies 50G12 and 279D11 have strong CDC activity, and 153F11 is relatively weak.

Example 7 Humanization of Murine Anti-Human CD38 Monoclonal Antibody

Step 1: Determination of the Variable Region Sequence of Murine Anti-Human CD38 Monoclonal Antibody Total RNA was extracted from a 50G12 hybridoma monoclonal cell line using Trizol, and mRNA was reverse-transcribed into cDNA using a reverse transcription kit. 50G12 light chain variable region gene and heavy chain variable region gene were amplified by PCR using the combined primers reported in the literature (*Antibody Engineering*, Volume 1, Edited by Roland Kontermann and Stefan Dubel, the sequences of the combined primers are from page 323), and then PCR products were cloned into pMD18-T vector. The variable region gene sequences were sequenced and analyzed. The sequence information of the 50G12 variable regions of murine antibody was as follows: the total length of the heavy chain variable region gene sequence is 357 bp, encoding 119 amino acid residues, wherein the nucleotide sequence is shown in SEQ ID NO: 13, and the amino acid sequence is shown in SEQ ID NO: 7. The total length of the light chain variable region gene sequence is 321 bp, encoding 107 amino acid residues, wherein the nucleotide sequence is shown in SEQ ID NO: 14, and the amino acid sequence is shown in SEQ ID NO: 8.

Step 2: Humanization of Murine Monoclonal Antibody Against Human CD38

The amino acid sequences of the heavy chain variable region and light chain variable region of 50G12 murine antibody were analyzed. The complementarity determinant regions (CDR) and frame regions (FR) of the heavy chain and light chain of 50G12 murine antibody were determined according to the Kabat rule. The amino acid sequences of the heavy chain CDR of 50G12 murine antibody are H-CDR1: SEQ ID NO: 1, H-CDR2: SEQ ID NO: 2 and H-CDR3: SEQ ID NO: 3, and the amino acid sequences of the light chain CDR are L-CDR1: SEQ ID NO: 4, L-CDR2: SEQ ID NO: 5 and L-CDR3: SEQ ID NO: 6.

The homology of the heavy chain variable region of murine 50G12 monoclonal antibody with the sequence of human IgG germ line was compared on https://www.ncbi.nlm.nih.gov/igblast/. IGHV1-46*01 was selected as heavy chain CDR transplantation template, and the heavy chain CDR of murine antibody 50G12 was transplanted into the IGHV1-46*01 skeleton region. WGQGTLVTVSS was added as the fourth frame region after H-CDR3 to obtain the heavy chain variable region sequence of CDR transplantation. Similarly, the homology of the light chain variable region of murine antibody 50G12 with the sequence human IgG germ line was compared. IGKV1-39*01 was selected as the light chain CDR transplantation template, and the light chain CDR of murine antibody 50G12 was transplanted into the skeleton region of IGKV1-39*01. FGQGTKVEIK was added after L-CDR3 as the fourth frame region to obtain the light chain variable region sequence of CDR transplantation. Based on the variable region of CDR transplantation, some amino acid sites in the frame region were performed reverse mutation. Reverse mutation is the mutation of some amino acids (amino acids that are important for maintaining the structure and affinity of the antibody) in the frame region of the CDR transplantation variable region into amino acids in the corresponding position of the frame region of the mouse origin.

During mutation, amino acid sequence was encoded by Kabat, and the location of site was indicated by Kabat code. Preferably, for CDR transplantation heavy chain variable region, according to the Kabat code, T at position 30 was mutated to N, M at position 69 was mutated to L, R at position 71 was mutated to A, and T at position 73 was mutated to K. For CDR transplantation light chain variable region, L at position 47 was mutated to W, I at position 48 was mutated to M, and F at position 71 was mutated to Y. The above heavy chain variable region and light chain variable region with mutation sites were defined as humanized heavy chain variable region and light chain variable region, named 50G12-Hu-VH and 50G12-Hu-VL, respectively. The amino acid sequence of 50G12-Hu-VH is SEQ ID NO: 9. The amino acid sequence of 50G12-hu-VL is SEQ ID NO: 10.

The DNA encoding the humanized heavy chain and light chain variable region was synthesized by Sangon Biotech (Shanghai) Co., Ltd. The synthetic humanized heavy chain variable region DNA was connected with the human IgG1 heavy chain constant region DNA to obtain the full-length humanized heavy chain DNA, named 50G12-Hu-HC. The human heavy chain variable region DNA sequence is shown in SEQ ID NO: 15, and the full-length humanized heavy chain DNA sequence is shown in SEQ ID NO: 17. The human light chain variable region DNA was connected with the human Kappa chain constant region DNA to obtain the full-length human light chain DNA, named 50G12-Hu-LC. The DNA sequence of human light chain variable region is shown in SEQ ID NO: 16, and the full-length human light chain DNA sequence is shown in SEQ ID NO: 18. The 50G12-Hu-HC and 50G12-Hu-LC genes were constructed into pcDNA3.4 expression vectors, respectively, and the antibody was expressed and purified using the method described in the above examples. Wherein, its heavy chain amino acid sequence is shown in SEQ ID NO: 11, and the light chain amino acid sequence is shown in SEQ ID NO: 12, and the obtained antibody is named 50G12-Humanized.

In addition, the heavy chain variable region of murine antibody 50G12 was connected with the constant region of human IgG1 heavy chain to obtain a chimeric heavy chain gene, named 50G12-Chi-HC. The light chain variable region of murine 50G12 was connected with the human Kappa chain constant region to obtain a chimeric light chain gene, named 50G12-Chi-LC. The 50G12-Chi-HC and 50G12-Chi-LC genes were constructed into pcDNA3.4 expression vectors, respectively, and the antibody was expressed and purified using the method described in the above examples. The antibody obtained is named 50G12-Chimeric.

Example 8 the Binding Ability of 50G12-Humanized to CD38

Flow cytometry was used to detect the binding capacity of 50G12-Chimeric and 50G12-Humanized to CD38 on the surface of Daudi cells. The specific methods were as follows:

After Daudi cells were counted, PBS solution containing 1% BSA was used to inoculate the cells into 96-well round-bottom culture plates with $2 \times 10^5$ cells per well. 50 µl anti-CD38 antibody in gradient dilution with PBS solution was added to the 96-well plate. The plate was incubated at room temperature for 1 h, then it was centrifuged to discard the supernatant. Then the cells was washed with PBS twice. FITC-labeled goat anti-human (Fc-Specific) antibody was added (1:1000 diluted with PBS containing 1% BSA) and the plate was incubated at room temperature for half an hour. The cells was centrifuged and washed, then the Mean Fluorescence Intensity (MFI) of the FITC channel was detected by flow cytometry. The flow cytometer software was used to process the experimental data and the mean fluorescence intensity was calculated. The GraphPad Prism6 was used for data analysis and mapping, and EC50 was calculated.

Figure 5:
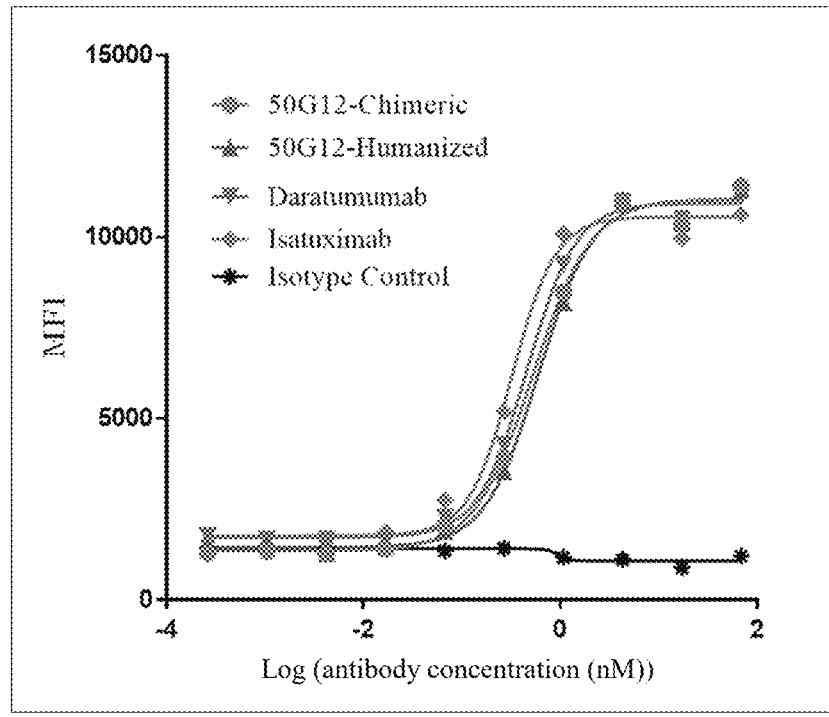
FIG. 5: Binding activity of the humanized antibody 50G12-Humanized to Daudi cells

As shown in FIG. 5, 50G12-Chimeric, 50G12-Humanized, Daratumumab, and Isatuximab can all effectively bind to Daudi cells, with EC50 values of 0.5285 nM, 0.6047 nM, 0.4596 nM and 0.3234 nM, respectively. The above results show that the binding ability of 50G12-Humanized to Daudi cells is basically comparable. Wherein, isotype Control is a human IgG1 antibody that does not bind to Daudi cells.

Example 9 50G12-Humanized Inhibiting CD38 Cyclase Activity

The inhibitory effect of 50G12-Humanized on CD38 cyclase activity was determined by fluorescence method. The specific methods were as follows:

50 mM MES buffer solution with PH6.5 was prepared, and 200 µM niacinamide guanine dinucleotide (NGD) solution was prepared with MES buffer solution. CD38-His was diluted to 2 µg/ml with MES buffer, and then anti-CD38 antibody with a final concentration of 10 µg/ml was added. F16 Black Maxisorp Plate was added with 50 µL NGD solution, followed by 50 µL solution containing CD38-His and anti-CD38 antibodies. The Relative Fluorescence Unit (RFU) was measured in kinetic mode using multifunction microplate reader SpectraMax M5, and the excitation and emission wavelengths were set at 300 nm and 410 nm, respectively. The GraphPad Prism6 was used for data analysis and mapping.

Figure 6:
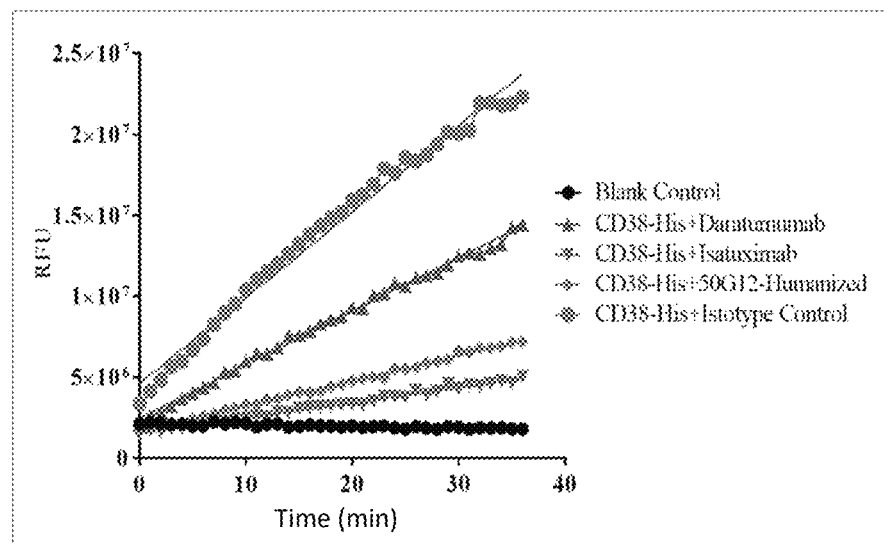
FIG. 6: Humanized antibody 50G12-Humanized inhibits human CD38 cyclase activity

The results are shown in FIG. 6, 50G12-Humanized, Daratumumab and Isatuximab can all effectively inhibit the enzyme activity of CD38-His, with slopes of 155931, 331046 and 93316, respectively. The smaller the slope is, the stronger the inhibition is. Therefore, the order of inhibition of CD38 cyclase activity from strong to weak is Isatuximab, 50G12-Humanized and Daratumumab.

Example 10 50G12-Humanized ADCC Activity Determination

The Fab segment of antibody binds to antigen epitopes on cell surface, and the Fc segment binds to Fc receptors on the surface of effector cells (NK cells, macrophages, etc.), which can mediate effector cells to directly kill target cells, that is the effect of ADCC. The ADCC activity of the anti-CD38 antibody was determined here. The specific methods were as follows:

The phenol red-free PMI-1640 was added with 2% fetal bovine serum. Target cells Daudi and human peripheral blood mononuclear cells (PBMC) were mixed in a ratio of 1:25 with the medium and were inoculated into a round-bottom 96-well plate with 150 µL/well. Finally, each well contained $2 \times 10^4$ Daudi cells and $5 \times 10^5$ PBMCs. 50 µL gradient diluted anti-CD38 antibody was added. The plate was incubated overnight in a 5% $CO_2$ cell incubator at 37° C. 50PL culture-supernatant was taken, and 50 µL CytoTox 96 Non-Radioactive Cytotoxicity Assay Reaction solution was added. After 30 min, termination solution was added to terminate the reaction, and OD490 was read by microplate reader. The GraphPad Prism6 was used for data analysis and mapping, and EC50 was calculated.

Figure 7:
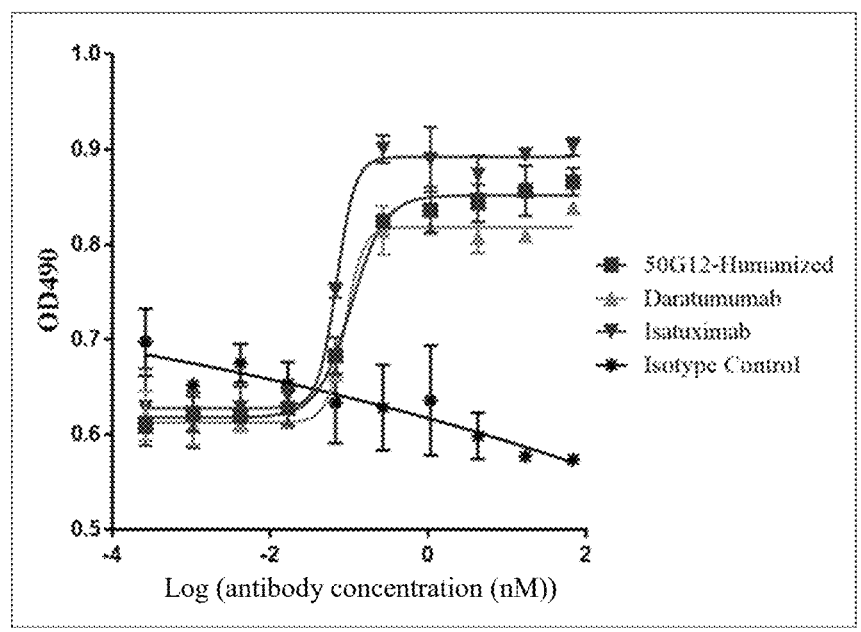
FIG. 7: ADCC activity of the humanized antibody 50G12-Humanized

As shown in FIG. 7, 50G12-Humanized, Daratumumab, and Isatuximab can all effectively kill target cells, with EC50 values of 0.1058 nM, 0.08876 nM, and 0.0694 nM, respectively, showing similar ADCC activity.

Example 11 50G12-Humanized CDC Activity Determination

The CDC activity of 50G12-Humanized was determined in Daudi and DND-41 cell models. The detailed experimental methods were as follows: anti-human CD38 monoclonal antibody was diluted to the initial concentration of 20 µg/ml using cell culture medium as buffer, and then diluted with a 3-fold concentration gradient to obtain a total of 8 concentrations of dilution. Target cells expressing CD38 (Daudi cells, etc.) were counted and resuspended to $3*10^5$ cells/ml. 100 µl of anti-human CD38 monoclonal antibody of various concentration dilutions and 80 µl of high-expression CD38 target cells were pre-incubated for 15 min, then 20 µl of 50% fresh human serum (donated by volunteers) was added and mixed. Positive control well was target cell alone added with serum, while the negative control well was cell-free medium. The cells were incubated in the incubator for 12-18h. After adding 20 µl CCK-8 for 4h, Microplate reader was used to measure the absorption value at 450 nm, and the killing rate was calculated according to the reading at 450 nm. The formula for calculating the killing rate is:

Killing rate (killing %)=(positive control absorption value−experimental group absorption value)/ (positive control absorption value−negative control absorption value)*100.

Figure 8A:
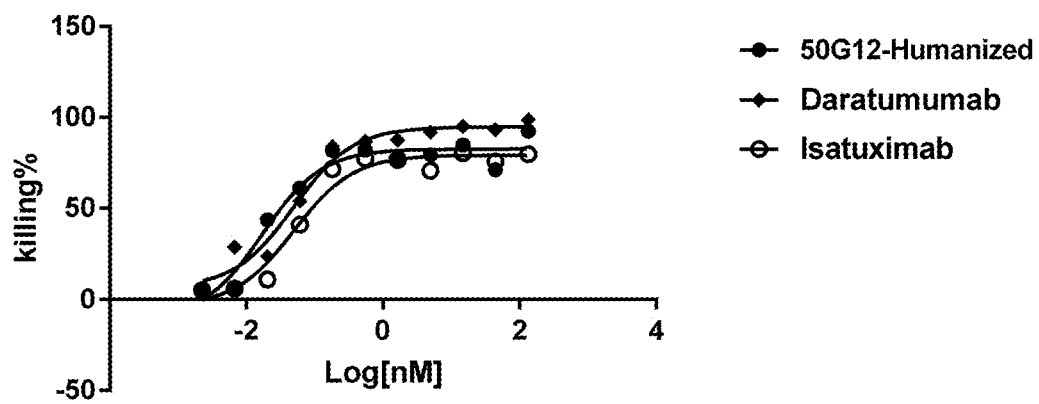
FIG. 8A: CDC activity of humanized antibody 50G12-Humanized on Daudi cells
Figure 8B:
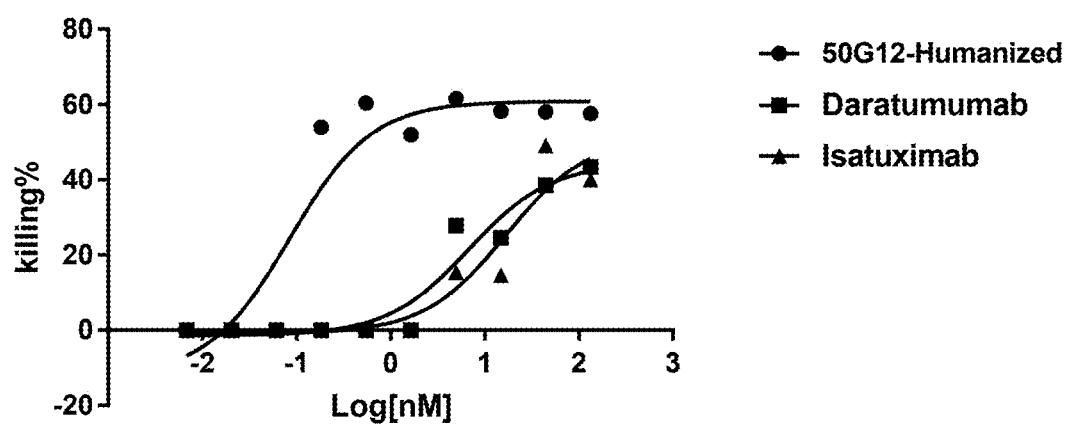
FIG. 8B: CDC activity of humanized antibody 50G12-Humanized on DND-41 cells

The experimental results are shown in FIGS. 8A and 8B. In Daudi cell model, the CDC activity of humanized antibody 50G12-Humanized is comparable to that of Daratumumab and Isatuximab. In DND-41 cell model, the CDC activity of the humanized antibody 50G12-Humanized is superior to Daratumumab and Isatuximab.

Example 12 The Ability of 50G12-Humanized to Induce Apoptosis

Anti-CD38 antibodies bind to the corresponding antigens on the cell membrane surface to induce apoptosis (Deckert J, Wetzel M, Bartle L M, et al. SAR650984, A Novel Humanized CD38-Targeting Antibody, Demonstrates Potent Antitumor Activity in Models of Multiple Myeloma and Other CD38+ Hematologic Malignancies[J]. Clinical Cancer Research, 2014, 20(17): 4574-4583). In apoptotic cells, the membrane phosphatidylserine (PS) is transferred from the inside to the outside of the cell membrane, exposing PS to the external cellular environment. Annexin V is a 35-36 KDa calcium ion dependent phospholipid binding protein with high affinity for PS and can bind to exposed PS. The apoptosis-inducing activity of the anti-CD38 antibody was determined using the FITC-labeled Annexin V apoptosis assay kit. The specific methods were as follows:

2% fetal bovine serum was added to RPMI-1640. Daudi cells were inoculated into 96-well plates with $1\times10^5$ cells/150 µL per well. 50 µL gradient diluted anti-CD38 antibody was added. The plate was incubated at 37° C. in 5% $CO_2$ cell incubator for 24h. Apoptotic cells were stained with FITC-labeled Annexin V apoptosis detection kit. The cells was centrifuged and washed, then the mean fluorescence intensity of the FITC channel was detected by flow cytometry. The flow cytometer software was used to process the experimental data and calculate the proportion of stained cells in the total cells. The GraphPad Prism6 was used for data analysis and mapping, and EC50 was calculated.

Figure 9:
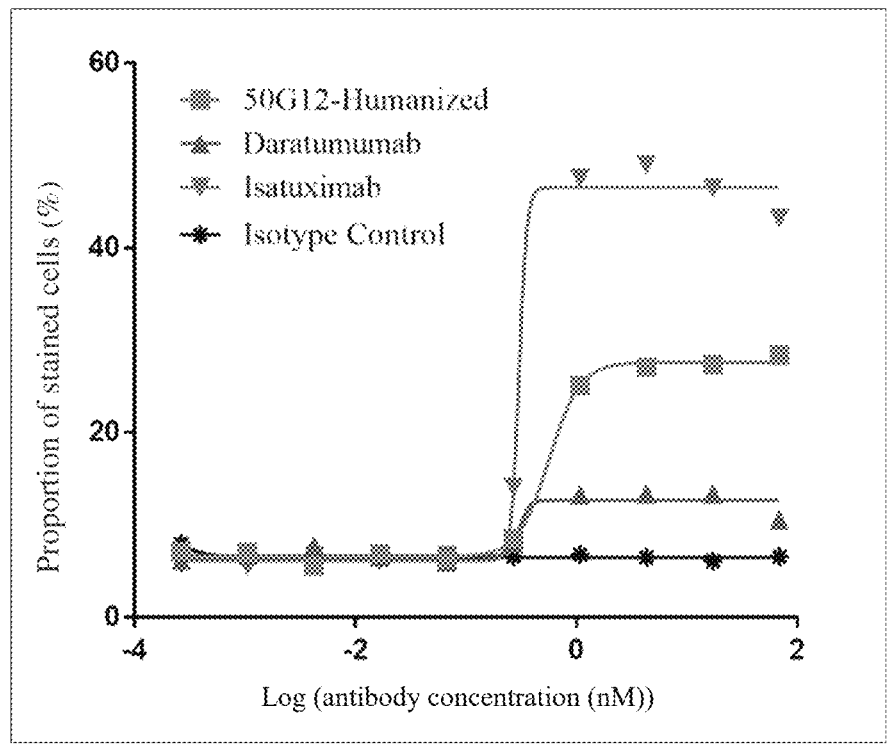
FIG. 9: The ability of humanized antibody 50G12-Humanized to induce apoptosis

As shown in FIG. 9, 50G12-Humanized, Daratumumab, and Isatuximab can all effectively induce apoptosis with EC50 values of 0.5675 nM, 0.3059 nM, and 0.302 nM, respectively. Although the $EC_{50}$ of the three is basically comparable, 50G12-Humanized, Daratumumab and Isatuximab cells can induce the highest proportion of apoptotic cells of 28.4%, 13.4% and 49.0%, respectively. Therefore, the ability of the three to induce apoptosis is in order from strong to weak is Isatuximab, 50G12-Humanized, and Daratumumab.

Example 13 In Vivo Efficacy Evaluation of 50G12-Humanized

The in vivo antitumor activity of anti-CD38 humanized antibody 50G12-Humanized was verified in a human Ramos lymphoma cell line CB-17 SCID mouse xenograft model. The specific methods were as follows:

Ramos cells were cultured in vitro, the cell concentration was adjusted to $5\times10^7$ cells/ml after harvest, and 200 µl cell suspension per mouse was inoculated into female CB-17 SCID mice by tail vein injection to establish a xenograft model. On day 7 after inoculation, mice were randomly divided into control group, Daratumumab treatment group, Isatuximab treatment group, and 50G12-Humanized treatment group with 10 mice in each group. Treatment was started at a dose of 40 mg/kg antibody twice a week for three weeks. The survival time of tumor-bearing mice was observed. The animal humanitarian endpoint is that unilateral hind limb or bilateral hind limb paralysis of tumor-bearing mice, or weight loss of more than 20%, or inability to eat and drink freely due to severe physical condition of tumor-bearing mice. The animal was euthanized and the survival time was recorded.

Figure 10:
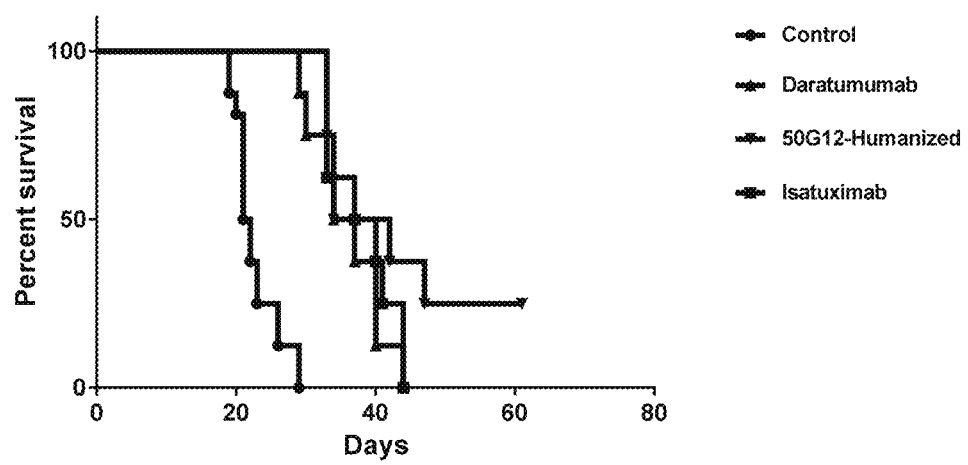
FIG. 10: Antitumor activity of humanized antibody 50G12-Humanized on Ramos lymphoma animal model

The results are shown in FIG. 10. The median survival time of the control group is 25 days. Compared with the control group, 50G12-Humanized and positive control antibodies Daratumumab and Isatuximab are able to significantly prolong the survival time of the test animals, with median survival times of 38 days, 35.5 days and 38.5 days, respectively.

The invention claimed is:

1. An antibody binding to human CD38 or antigen-binding fragment thereof, comprising:
   (a) heavy chain complementarity determining regions H-CDR1, H-CDR2, H-CDR3, wherein the amino acid sequence of H-CDR1 is shown in SEQ ID NO: 1, the amino acid sequence of H-CDR2 is shown in SEQ ID NO: 2, the amino acid sequence of H-CDR3 is shown in SEQ ID NO: 3, and
   (b) light chain complementarity determining regions L-CDR1, L-CDR2, L-CDR3, wherein the amino acid sequence of L-CDR1 is shown in SEQ ID NO: 4, the amino acid sequence of L-CDR2 is shown in SEQ ID NO: 5, the amino acid sequence of L-CDR3 is shown in SEQ ID NO: 6.

2. The antibody binding to human CD38 or antigen-binding fragment thereof of claim 1, wherein the antibody is murine antibody, chimeric antibody or humanized antibody.

3. The antibody binding to human CD38 or antigen-binding fragment thereof of claim 1, wherein the antigen-binding fragment comprises a Fab fragment, a F(ab')$_2$ fragment, a Fv fragment.

4. The antibody binding to human CD38 or antigen-binding fragment thereof of claim 1, wherein the amino acid sequence of the heavy chain variable region of the antibody binding to human CD38 or antigen-binding fragment thereof is shown in SEQ ID NO: 7, and the amino acid sequence of the light chain variable region of that is shown in SEQ ID NO: 8.

5. The antibody binding to human CD38 or antigen-binding fragment thereof of claim 1, wherein the amino acid sequence of the heavy chain variable region of the antibody binding to human CD38 or antigen-binding fragment thereof is shown in SEQ ID NO: 9, and the amino acid sequence of the light chain variable region of that is shown in SEQ ID NO: 10.

6. The antibody binding to human CD38 or antigen-binding fragment thereof of claim 1, wherein the amino acid sequence of the heavy chain of the antibody binding to human CD38 or antigen-binding fragment thereof is shown in SEQ ID NO: 11, and the amino acid sequence of the light chain of that is shown in SEQ ID NO: 12.

7. A nucleotide molecule encoding the antibody binding to human CD38 or antigen-binding fragment thereof of claim 1.

8. The nucleotide molecule of claim 7, wherein the nucleotide sequence of the nucleotide molecule encoding the heavy chain variable region is shown in SEQ ID NO: 13, and the nucleotide sequence of that encoding the light chain variable region is shown in SEQ ID NO: 14.

9. The nucleotide molecule of claim 7, wherein the nucleotide sequence of the nucleotide molecule encoding the heavy chain variable region is shown in SEQ ID NO: 15, and the nucleotide sequence of that encoding the light chain variable region is shown in SEQ ID NO: 16.

10. The nucleotide molecule of claim 7, wherein the nucleotide sequence of the nucleotide molecule encoding the heavy chain is shown in SEQ ID NO: 17, and the nucleotide sequence of that encoding the light chain is shown in SEQ ID NO: 18.

11. An expression vector comprising the nucleotide molecule of claim 7.

12. A host cell comprising the expression vector of claim 11.

13. A method for preparing the antibody binding to human CD38 or antigen-binding fragment thereof of claim 1, which comprises the following steps:
  a) culturing a host cell comprising an expression vector comprising a nucleotide molecule encoding the antibody binding to human CD38 or antigen-binding fragment thereof of claim 1 under conditions for expression to express the antibody binding to human CD38 or antigen-binding fragment thereof;
  b) isolating and purifying the antibody binding to human CD38 or antigen-binding fragment thereof.

14. A composition comprising the antibody binding to human CD38 or antigen-binding fragment thereof of claim 1 and a pharmaceutically acceptable carrier.

15. A CAR construct comprising a scFv, wherein the scFv comprises (i) a heavy chain variable region which comprises:

heavy chain complementarity determining regions H-CDR1, H-CDR2, H-CDR3, wherein the amino acid sequence of H-CDR1 is shown in SEQ ID NO: 1, the amino acid sequence of H-CDR2 is shown in SEQ ID NO: 2, the amino acid sequence of the H-CDR3 is shown in SEQ ID NO: 3, and (ii) a light chain variable region which comprises:

light chain complementarity determining regions L-CDR1, L-CDR2, L-CDR3, wherein the amino acid sequence of L-CDR1 is shown in SEQ ID NO: 4, the amino acid sequence of L-CDR2 is shown in SEQ ID NO: 5, the amino acid sequence of the L-CDR3 is shown in SEQ ID NO: 6.

16. A recombinant immune cell expressing exogenous CAR construct of claim 15.

17. An antibody-drug conjugate, comprising:
  (a) an antibody moiety, which comprises the antibody or antigen-binding fragment of claim 1; and
  (b) a coupling moiety coupled to the antibody moiety, wherein the coupling moiety is selected from the group consisting of a detectable label, a drug, a toxin, a cytokine, a radionuclide, an enzyme, and a combination thereof.

18. A method for in vitro detection of CD38 protein in a sample, which comprises the steps:
  (a) contacting the sample with the antibody or antigen-binding fragment thereof of claim 1 or an antibody-drug conjugate of the antibody or antigen-binding fragment thereof in vitro;
  (b) detecting whether an antigen-antibody complex is formed, wherein the formation of the complex indicates the presence of CD38 protein in the sample.

19. A method for treating CD38-related diseases, comprising: administering to the subject in need with the antibody binding to human CD38 or antigen-binding fragment thereof claim 1, a composition comprising the antibody binding to human CD38 or antigen-binding fragment thereof and a pharmaceutically acceptable carrier, an antibody-drug conjugate of the antibody or antigen-binding fragment thereof, or combinations thereof.

20. The method of claim 19, wherein the CD38-related disease is selected from multiple myeloma, leukemia, B lymphocytoma, autoimmune disease, or a combination thereof.

21. A method for treating CD38-related diseases, comprising: administering to the subject in need with the recombinant immune cell of claim 16, wherein the recombinant immune cell is a CAR-T cell or a CAR-NK cell.

22. The method of claim 21, wherein the CD38-related disease is selected from multiple myeloma, leukemia, B lymphocytoma, autoimmune disease, or a combination thereof.

* * * * *